US010846887B2

(12) United States Patent
Dong et al.

(10) Patent No.: US 10,846,887 B2
(45) Date of Patent: Nov. 24, 2020

(54) MACHINE VISION PROCESSING SYSTEM

(71) Applicant: MICROSOFT TECHNOLOGY LICENSING, LLC, Redmond, WA (US)

(72) Inventors: Yue Dong, Redmond, WA (US); Xin Tong, Redmond, WA (US); Lin Liang, Redmond, WA (US); Jian Shi, Redmond, WA (US); Stephen S. Lin, Redmond, WA (US); Simon Stachniak, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 315 days.

(21) Appl. No.: 15/738,553

(22) PCT Filed: Jun. 24, 2016

(86) PCT No.: PCT/US2016/039127
§ 371 (c)(1),
(2) Date: Dec. 20, 2017

(87) PCT Pub. No.: WO2016/210201
PCT Pub. Date: Dec. 29, 2016

(65) Prior Publication Data
US 2018/0189978 A1  Jul. 5, 2018

(30) Foreign Application Priority Data

Jun. 26, 2015  (CN) .......................... 2015 1 0362657

(51) Int. Cl.
*G06T 7/90* (2017.01)
*G06T 11/00* (2006.01)
(Continued)

(52) U.S. Cl.
CPC ................ *G06T 7/90* (2017.01); *G06T 5/008* (2013.01); *G06T 7/11* (2017.01); *G06T 7/136* (2017.01);
(Continued)

(58) Field of Classification Search
CPC combination set(s) only.
See application file for complete search history.

(56) References Cited

U.S. PATENT DOCUMENTS 7,084,868 B2   8/2006  Farag et al.
7,227,977 B1   6/2007  Dotsenko
(Continued)

FOREIGN PATENT DOCUMENTS

CN           102985943 A      3/2013

OTHER PUBLICATIONS

Dong et al., "AppGen: Interactive Material Modeling from a Single Image", Dec. 2011 (Year: 2011).*
(Continued)

*Primary Examiner* — Zhiyu Lu

(57) ABSTRACT

Techniques and constructs can determine an albedo map and a shading map from a digital image. The albedo and shading maps can be determined based at least in part on a color-difference threshold. A color shading map can be determined based at least in part on the albedo map, and lighting coefficients determined based on the color shading map. The digital image can be adjusted based at least in part on the lighting coefficients. In some examples, respective shading maps can be produced for individual color channels of the digital image. The color shading map can be produced based at least in part on the shading maps. In some examples, a plurality of regions of the digital image can be determined, as can proximity relationships between individual regions.

(Continued)

The albedo shading maps can be determined based at least in part on the proximity relationships.

20 Claims, 9 Drawing Sheets

(51) Int. Cl.
  *G06T 7/40* (2017.01)
  *G06T 7/136* (2017.01)
  *G06T 7/11* (2017.01)
  *G06T 5/00* (2006.01)

(52) U.S. Cl.
  CPC .............. *G06T 7/40* (2013.01); *G06T 11/001* (2013.01); *G06T 2207/10024* (2013.01)

(56) References Cited

U.S. PATENT DOCUMENTS

| | | | |
|---|---|---|---|
| 2008/0279423 | A1 | 11/2008 | Zhang et al. |
| 2010/0259651 | A1 | 10/2010 | Fattal |
| 2011/0274351 | A1 | 11/2011 | Tsukada |
| 2013/0021340 | A1 | 1/2013 | Shim et al. |
| 2015/0043806 | A1 | 2/2015 | Karsch et al. |

OTHER PUBLICATIONS

Yu et al., "Recovering Photometric Properties of Architectural Scenes From Photographs", Jul. 1998 (Year: 1998).*
"First Office Action and Search Report Issued in Chinese Patent Application No. 201510362657.7", dated Aug. 3, 2018, 17 Pages.
Barron, et al., "Color Constancy, Intrinsic Images, and Shape Estimation", In European Conference on Computer Vision, Oct. 7, 2012, 14 Pages.
Rother, et al., "Recovering Intrinsic Images with a Global Sparsity Prior on Reflectance", In Proceedings of Advances in Neural Information Processing Systems, Jan. 2011, 9 Pages.
"International Preliminary Report on Patentability Issued in PCT Application No. PCT/US2016/039127", dated Sep. 25, 2017, 8 Pages.
"International Search Report and Written Opinion Issued in PCT Application No. PCT/US2016/039127", dated Dec. 5, 2016, 14 Pages.
"Second Written Opinion Issued in PCT Application No. PCT/US2016/039127", dated Jun. 27, 2017, 7 Pages.
Tappen, et al., "Recovering Intrinsic Images from a Single Image", In IEEE Transactions on Pattern Analysis and Machine Intelligence, vol. 27, Issue 9, Sep. 2005, 8 Pages.
Tsai, et al., "Shape from Shading with Variable Albedo", In Journal of Optical Engineering, vol. 37, Issue 4, Apr. 1, 1998, pp. 1212-1220.
Zou, et al., "Robust Albedo Estimation from Face Image Under Unknown Illumination", In Proceedings International Society for Optics and Photonics of Biometric Technology for Human Identification, vol. 6944, Mar. 17, 2008, pp. 69440A-1-69440A-11.
"Second Office Action Issued in Chinese Patent Application No. 201510362657.7", dated Apr. 12, 2019, 14 Pages.
"Third Office Action Issued in Chinese Patent Application No. 201510362657.7", dated Aug. 30, 2019, 13 Pages.
Zhao, et al., "A Closed-Form Solution to Retinex with Nonlocal Texture Constraints", In Journal of IEEE Transactions on Pattern Analysis and Machine Intelligence, vol. 34, Issue 7, Jul. 2012, pp. 1437-1444.
Bell, et al., "Intrinsic Images in the Wild", In Journal of ACM Transactions on Graphics, vol. 33, Issue 4, Jul. 27, 2014, 12 Pages.
Bonneel, et al., "Interactive Intrinsic Video Editing", In Journal of ACM Transactions on Graphics (TOG), vol. 33, Issue 6, Nov. 19, 2014, 10 Pages.
Chen, et al., "A Simple Model for Intrinsic Image Decomposition with Depth Cues", In Proceedings of the IEEE International Conference on Computer Vision, Dec. 1, 2013, pp. 241-248.
Chung, et al., "Intrinsic Image Extraction from a Single Image", In Journal of Information Science and Engineering, vol. 25, Issue 6, Nov. 1, 2009, pp. 1939-1953.
Comaniciu, et al., "Mean Shift: A Robust Approach Toward Feature Space Analysis", In Journal of IEEE Transactions on Pattern Analysis and Machine Intelligence, vol. 24, Issue 5, May 2002, pp. 603-619.
Garces, et al., "Intrinsic Images by Clustering", In Proceedings of Eurographics Symposium on Rendering, vol. 31, No. 4, Jun. 27, 2012, 10 Pages.
Kerr, Douglas A., "A Metric for Chromaticity Difference", Retrieved From: http://dougkerr.net/Pumpkin/articles/Chromaticity_Metric.pdf, Feb. 28, 2018, 9 pages.
Lee, et al., "Estimation of Intrinsic Image Sequences from Image+Depth Video", In Proceedings of 12th European Conference on Computer Vision, vol. Part VI, Oct. 7, 2012, pp. 327-340.
Li, et al., "Bayesian Depth-from-Defocus with Shading Constraints", In Proceedings of Conference on Computer Vision and Pattern Recognition, Jun. 23, 2013, pp. 217-224.
Li, et al., "Intrinsic Face Image Decomposition with Human Face Priors", In Proceedings of 13th European Conference on Computer Vision, Sep. 6, 2014, pp. 218-233.
Neverova, Natalia, "3D Scene Reconstruction and Augmenting using Depth Sensors", In Master Thesis Report, University Jean Monnet, Jul. 15, 2012, 103 Pages.
Pfaller, Sven, "Lighting Environment Estimation on Objects with Varying Surface Reflectance", In Thesis in Computer Science, Retrieved on: Mar. 27, 2015, 61 Pages.
Ye, et al., "Intrinsic Video and Applications", In Journal of ACM Transactions on Graphics (TOG), vol. 33, Issue 4, Jul. 27, 2014, 11 Pages.

* cited by examiner

MACHINE VISION PROCESSING SYSTEM

CROSS-REFERENCE TO RELATED APPLICATION

This application is a U.S. National Stage Application of PCT/US2016/039127, filed Jun. 24, 2016, which claims priority to Chinese Patent Application No. 201510362657.7, filed Jun. 26, 2015, which applications are hereby incorporated by reference. To the extent appropriate, a claim of priority is made to each of the above disclosed applications.

BACKGROUND

Machine vision techniques are used for a wide variety of uses. Real-world objects are generally non-planar. Accordingly, images of real-world objects or other captured or machine-generated images often include content arising from the color or decoration of the object, referred to herein as the object's "albedo," and content arising from the lighting of the object, referred to herein as the object's "shading." The geometry of the object causes the shading to vary across the surface of the object. Accordingly, albedo content and shading content are often combined in an image. Such combinations can reduce the accuracy of machine-vision algorithms such as object location, orientation detection, or human-face detection.

SUMMARY

This disclosure describes systems, methods, and computer-readable media for determining albedo and shading information from digital images, referred to herein as "decomposing" digital images. In some examples, a computing system can produce an albedo map and a shading map from the digital image using a color-difference threshold. The computing system can produced a revised digital image by determining a color shading map using the albedo map and the digital image, determining lighting coefficients based on the color shading map, and adjusting the digital image based on the lighting coefficients. According to example techniques described herein, the computing system can produce a revised albedo map and a revised shading map using the revised digital image. In some examples, the computing system can produce respective albedo maps and respective shading maps for individual color channels of a digital image. The computing system can then produce the color shading maps based on the respective per-channel shading maps.

In some examples, the computing system can determine regions of the digital image. The computing system can then determine one or more proximity relationships between individual ones of the regions and determine the albedo and shading maps using the proximity relationships. According to various examples herein, one of the proximity relationships can correspond to an albedo difference between neighboring regions having colors closer than a color-difference threshold. According to various examples herein, one of the proximity relationships can correspond to a shading difference between neighboring regions.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to systems, methods, computer-readable instructions, modules, algorithms, hardware logic, and/or operations as permitted by the context described above and throughout the document.

BRIEF DESCRIPTION OF THE DRAWINGS

The detailed description is described with reference to the accompanying figures. In the figures, the left-most digits of a reference number identifies the figure in which the reference number first appears. The same reference numbers in different figures indicate similar or identical items.

DETAILED DESCRIPTION

Overview

Figure 1:
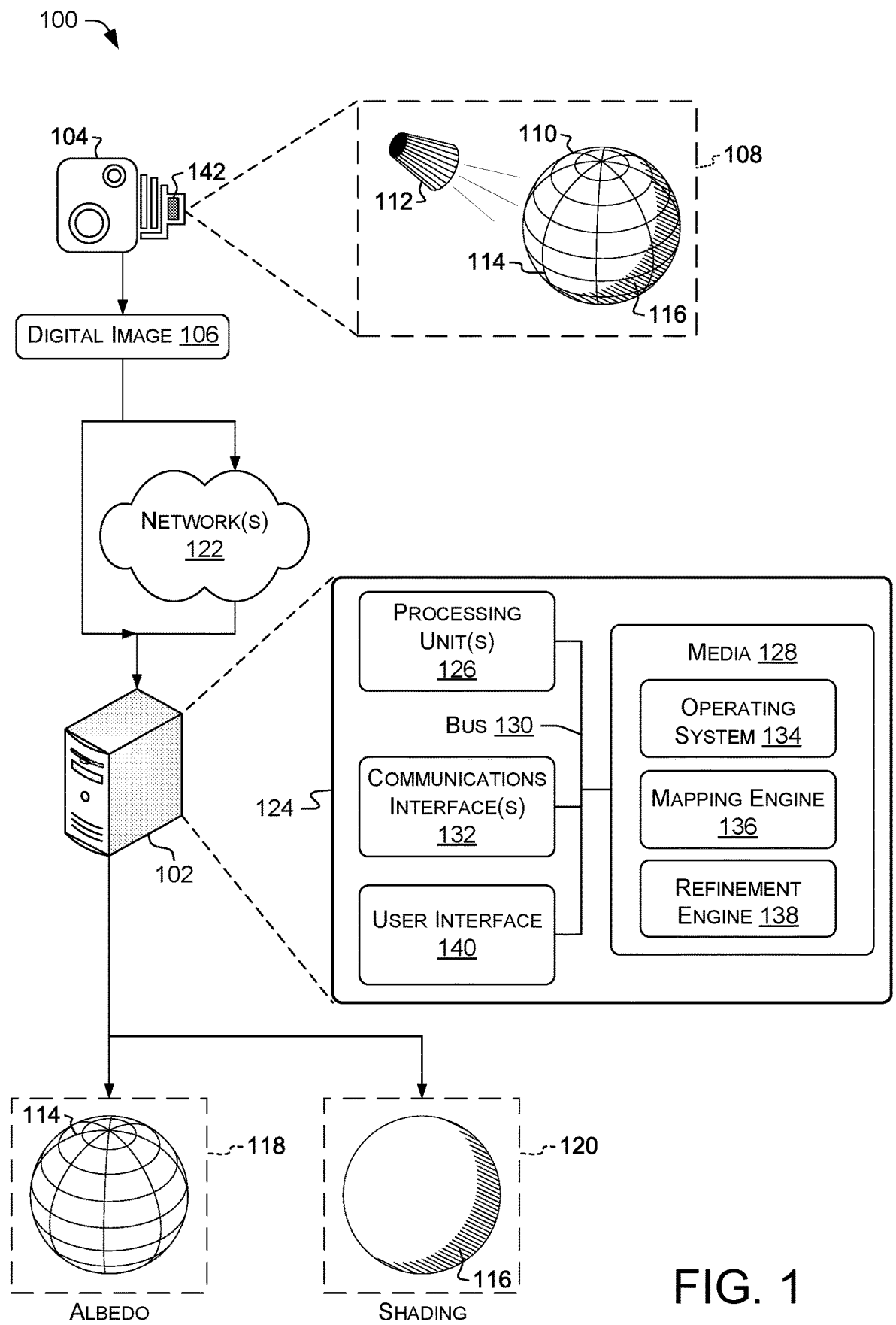
FIG. 1 is a block diagram depicting an example environment for implementing image decomposition as described herein.

Examples described herein provide techniques and constructs to determine albedo and shading components of an image. This separation can permit various machine vision algorithms to operate with increased speed, increased precision, reduced compute time, or reduced memory requirements. This separation can also permit additional techniques to be performed, such as relighting, rendering in a virtual environment, or three-dimensional (3-D) printing. For example, in relighting, an image of an object is used to determine the object's albedo. An image is then generated showing the object under different lighting conditions (different shading) than in the image of the object. Relighting and other techniques using separated albedo and shading information can also be used to accurately render the object in a virtual environment. Separating albedo and shading can also permit rendering images of, or 3-D printing or otherwise modeling, the object with its albedo but without the shading. Various examples permit determining albedo information to be combined with 3-D scanner data to produce a virtual model of the object and its surface appearance.

As used herein, the albedo information and shading information are referred to individually or collectively as "intrinsic images" or "maps." Determination of albedo information and shading information from an input image is referred to as "image decomposition." As used herein, "albedo" and "shading" do not require that the albedo or shading of an entire 3-D object be determined. It is sufficient to determine albedo or shading of portion(s) of the object visible in any image or set of image(s) of the object. The term "intrinsic image" does not require that albedo information or shading information be determined or presented in the form of an image; other representations can be used, such as boundary polygons of areas of substantially constant albedo. The term "machine vision" does not require that a camera, robot, or other specific machine-vision hardware be used, although techniques herein can be used with such hardware.

Some examples described herein provide improved performance compared to conventional intrinsic-image algorithms. Some examples using regions instead of pixels as the basic units of analysis reduce the amount of memory space and computation time required to determine intrinsic images. Some examples advantageously separate a two-dimensional image, e.g., an image with optical information ranged across two spatial dimensions but without depth information, into albedo and shading information. Some examples can advantageously determining shading information for scenes illuminated by multiple lights or by chromatic lights, i.e., lights that are not substantially white while illuminating a scene. A light can be chromatic at any positive radiant intensity.

Some examples, scenarios, and examples of techniques for image decomposition in accordance with some examples are presented in greater detail in the following description of the figures.

Illustrative Environment

FIG. 1 shows an example environment 100 in which examples of image-decomposition systems can operate or in which image decomposition methods such as described below can be performed. In the illustrated example, various devices and/or components of environment 100 include a computing device 102, depicted as a server computer, and an image source 104, depicted as a camera. Image source 104 can include one or more computing device(s) or other systems configured to provide digital images 106. In the illustrated example, image source 104 provides a digital image of a scene 108. Scene 108 includes an object 110, in this example a sphere, lit by a light source 112. Object 110 has an albedo 114, depicted in this example as a grid of latitude and longitude lines. Because of the angle of light source 112 with respect to the viewpoint from which digital image 106 is captured, in this example, the image data of object 110 in digital image 106 includes a region including a shadow 116. In other examples, effects from the light source 112 may be visible in the scene 108 although light source 112 may not be included in the scene 108.

Various aspects herein determine an albedo map 118 and a shading map 120, depicted without limitation as images. Albedo map 118 includes, in this example, the lines forming the albedo 114 but not the shadow 116, and shading map 120 includes, in this example, the shadow 116 but not the albedo 114. In some examples, computing device 102 determines albedo map 118 and shading map 120. The particular depictions of object 110, digital image 106, albedo 114, shadow 116, albedo map 118, and shading map 120 are not limiting. In some examples, the albedo map 118 includes a color image and the shading map 120 includes a grayscale image or an intensity image of a selected color channel, as described below.

Computing device 102 and image source 104 can include a diverse variety of device categories, classes, or types, e.g., desktop computers, laptop computers, tablet computers, digital cameras, or cellular phones, and are not limited to a particular type of device. For example, computing device 102 can be a computing node in a computing cluster (not shown), e.g., a cloud service such as MICROSOFT AZURE, or other distributed computing resources. Cloud computing permits computing resources to be provided as services rather than a deliverable product. For example, in a cloud-computing environment, computing power, software, information, and/or network connectivity are provided (for example, through a rental agreement) over a network, such as the Internet. Example components of computing device 102 and image source 104 are listed below.

In some examples, image source 104 is embodied in or connected to computing device 102. For example, image source 104 and computing device 102 can be embodied in a smartphone, tablet, MICROSOFT SURFACE, or other device configured to capture an image and decompose the captured image. This can advantageously permit decomposing images even when not connected to a network. In some examples, image source 104 is embodied in or connected to another computing device (omitted for brevity) separate from computing device 102. In some examples, image source 104 can be communicatively connected with computing device 102 via one or more network(s) 122. For example, image source 104 can be embodied in a smartphone and computing device 102 can be embodied in a cloud or other hosted image-decomposition service. In some examples, computing devices 102 or image sources 104 can communicate with other computing devices (not shown) via one or more networks 122. In some examples, computing devices 102 or image sources 104 can communicate with external devices via networks 122. For example, networks 122 can include public networks such as the Internet, private networks such as an institutional or personal intranet, or combinations of private and public networks. Further examples of networks 122 are described below.

Components of an example computing device 102 are illustrated at inset 124. The details of example computing device 102 can be representative of other computing devices 102 or of image source(s) 104. However, individual ones of computing devices 102 or image sources 104 can include additional or alternative hardware and/or software components. Computing device 102 can include one or more processing units 126 operably connected to one or more computer-readable media 128 such as via a bus 130, which in some instances can include one or more of a system bus, a data bus, an address bus, a Peripheral Component Interconnect (PCI) Express (PCIe) bus, a PCI bus, a Mini-PCI bus, and any variety of local, peripheral, or independent buses, or any combination thereof. In some examples, plural processing units 126 can exchange data through an internal interface bus (e.g., PCIe), rather than or in addition to network 122. Further examples of processing units 126 and computer-readable media 128 are described below.

Computing device 102 or image source 104 can include one or more communications interfaces 132 to enable wired or wireless communications between computing devices 102 or image source 104 and other networked computing devices 102 or image sources 104 involved in image decomposition, or other computing devices, over networks 122. For example, communications interface 132 can include a transceiver device such as a network interface controller (NIC) to send and receive communications over network 122.

In some examples, computer-readable media 128 can store instructions executable by the processing units 126. Computer-readable media 128 can store, for example, executable instructions of an operating system 134, a mapping engine 136, a refinement engine 138, and other modules, programs, or applications that are loadable and executable by processing units 126. In some examples, the computer-executable instructions stored on the computer-readable media 128 can upon execution configure a computer such as a computing device 102 or image source 104 to perform operations described herein with reference to the operating system 134, the mapping engine 136, or the refinement engine 138. Further details of operating system 134 are discussed below.

In some examples, computing device 102 or image sources 104 can include a user interface 140. User interface 140 can include one or more output devices configured for communication to a user or to another computing device 102 or image source 104. Output devices can be integral or peripheral to computing device 102 or image source 104. Examples of output devices can include a display, a printer, audio speakers, beepers, or other audio output devices, a vibration motor, linear vibrator, or other haptic output device, and the like.

User interface 140 can include one or more input devices, integral or peripheral to computing device 102 or image source 104. The input devices can be user-operable, or can be configured for input from other computing device 102 or image source 104. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device, a gestural input device such as a touchscreen, a grip sensor, an accelerometer, another haptic input, a visual input device such as one or more cameras or image sensors, and the like.

In some examples, computing device 102 or image source 104 can include one or more sensors 142, e.g., configured to provide digital images or data that can be processed into digital images. Example image sensors can include front- and rear-facing cameras of a smartphone, a light sensor (e.g., a CdS photoresistor or a phototransistor), a still imager (e.g., a charge-coupled device (CCD), a complementary metal-oxide-semiconductor (CMOS) sensor, etc.), a video imager (e.g., CCD or CMOS), a fingerprint reader, a retinal scanner, an iris scanner, a computed-radiography scanner, or the like.

In various examples, computing device 102 and image source 104 can include, but are not limited to, server computers or blade servers such as Web servers, map/reduce servers or other computation engines, or network-attached-storage units, laptop computers, thin clients, terminals, or other mobile computers, wearable computers such as smart watches or biometric or medical sensors, implanted computing devices such as biometric or medical sensors, or fixed sensors such as Internet of Things (IoT) sensors configured to monitor time, environmental conditions, vibration, motion, or other attributes of the world or structures or devices therein, e.g., bridges or dams, computer navigation client computing devices, satellite-based navigation system devices including global positioning system (GPS) devices and other satellite-based navigation system devices, tablet computers or tablet hybrid computers, smartphones, mobile phones, mobile phone-tablet hybrid devices, or other telecommunication devices, portable or console-based gaming devices or other entertainment devices such as network-enabled televisions, set-top boxes, media players, cameras, or personal video recorders (PVRs), automotive computers such as vehicle control systems, vehicle security systems, or electronic keys for vehicles, personal data assistants (PDAs), desktop computers, or integrated components for inclusion in computing devices, appliances, or other computing devices configured to participate in or carry out image decomposition as described herein, e.g., for determining albedo or shading information from a digital image 106. In some examples, as indicated, computing devices, e.g., computing device 102 and image source 104, can intercommunicate to participate in or carry out image decomposition as described herein.

Different devices or types of devices can have different uses for intrinsic-image data. For example, controllers for robots or industrial machines can use albedo information to determine the location of workpieces independently of the lighting of those pieces. 3-D printing systems can apply albedo information to models to be printed, permitting more accurately reproducing existing objects from images of those objects. Various aspects use such images captured with 2-D image-capture equipment such as conventional cameras or image sensors, permitting determining albedo and shading without the expense, processing time, or memory requirements of 3-D scanning or imaging. Relighting and rendering systems can use the albedo information to produce depictions of object 110 under lighting conditions different from those in digital image 106. Forensic systems can use the shading information to determine the lighting conditions under which digital image 106 was captured.

In the example of FIG. 1, the processing units 126 are described as residing on the computing device 102. The processing units 126 can additionally or alternatively reside on different computing devices 102 or image sources 104 in some examples. In some examples, at least two of the processing units 126 can reside on different computing devices 102 or image sources 104. In such examples, multiple processing units 126 on the same computing device 102 or image source 104 can use a bus 130 of the computing device 102 or image source 104 to exchange data, while processing units 126 on different computing devices 102 or image sources 104 can exchange data via networks 122.

In various examples, networks 122, FIG. 1, can also include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Networks 122 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, networks 122 can also include a number of devices that facilitate network communications or form a hardware infrastructure for the networks, such as switches, routers, gateways, access points, firewalls, base stations, repeaters, backbone devices, and the like. Networks 122 can also include devices that facilitate communications between computing devices 102 or image sources 104 using bus protocols of various topologies, e.g., crossbar switches, INFINIBAND switches, or FIBRE CHANNEL switches or hubs. Different networks have different characteristics, e.g., bandwidth, latency, accessibility (open, announced but secured, or not announced), or coverage area.

In some examples, networks 122 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof.

As discussed above, in some examples, communications interfaces of computing device 102 or image source 104 can include one or more transceiver devices, e.g., network interface controllers (NICs) such as Ethernet NICs or other types of transceiver devices, to send and receive communications over a network. The processing units 126 can exchange data through respective communications interfaces. In some examples, the communications interface can be a PCIe transceiver, and the network 122 can be a PCIe bus. In some examples, the communications interface can include, but is not limited to, a transceiver for cellular (3G, 4G, or other), WI-FI, Ultra-wideband (UWB), BLUETOOTH, or satellite transmissions. The communications interface can include a wired I/O interface, such as an Ethernet interface, a serial interface, a Universal Serial Bus (USB) interface, an INFINIBAND interface, or other wired interfaces. For simplicity, these and other components are omitted from the illustrated computing device 102.

Processing units 126, FIG. 1, can be or include one or more single-core processors, multi-core processors, CPUs, GPUs, general-purpose graphics processing units (GPGPUs), or hardware logic components configured, e.g., via specialized programming from modules or APIs, to perform functions described herein. For example, and without limitation, illustrative types of hardware logic components that can be used in or as processing units 126 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 126 can represent a hybrid device, such as a device from ALTERA or XILINX that includes a CPU core embedded in an FPGA fabric. These or other hardware logic components can operate independently or, in some instances, can be driven by a CPU. In some examples, at least some of computing devices 102 or image sources 104 can include a plurality of processing units 126 of multiple types. For example, the processing units 126 in computing device 102 can be a combination of one or more GPGPUs and one or more FPGAs. Different processing units 126 can have different execution models, e.g., as is the case for graphics processing units (GPUs) and central processing unit (CPUs). In some examples, processing units 126, computer-readable media 128, and modules or engines stored on computer-readable media 128 can together represent an ASIC, FPGA, or other logic device configured to carry out the functions of such modules or engines.

Computer-readable media described herein, e.g., computer-readable media 128, FIG. 1, includes computer storage media and/or communication media. Computer storage media (e.g., a computer storage medium) includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 128 can store instructions executable by external processing units such as by an external CPU or external processor of any type discussed above. In some examples at least one processing unit 126, e.g., a CPU, GPU, or hardware logic device, is incorporated in computing device 102, while in some examples at least one processing unit 126, e.g., one or more of a CPU, GPU, or hardware logic device, is external to computing device 102.

Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 102 or image source 104.

In contrast to computer storage media, communication media can embody computer-readable instructions, data structures, program modules, or other data in a modulated data signal, such as a carrier wave, or other transmission mechanism. As defined herein, computer storage media does not include communication media.

In some examples not shown, one or more of the processing units 126 in one of the computing devices 102 or image sources 104 can be operably connected to computer-readable media 128 in a different one of the computing devices 102 or image sources 104, e.g., via communications interface 132 and network 122. For example, program code to perform functions of blocks illustrated herein or steps of flow diagrams herein can be downloaded from a server, e.g., computing device 102, to a client, e.g., image source 104, e.g., via the network 122, and executed by one or more processing units 126 in image source 104.

Computer-readable media 128 of the computing device 102 can store an operating system 134. In some examples, operating system 134 is not used (commonly referred to as a "bare metal" configuration). In some examples, operating system 134 can include components that enable or direct the computing device 102 to receive data via various inputs (e.g., user controls, network or communications interfaces, memory devices, or sensors), and process the data using the processing units 126 to generate output. The operating system 134 can further include one or more components that present the output (e.g., display an image on an electronic display, store data in memory, transmit data to another computing device, etc.). The operating system 134 can enable a user to interact with software applications, e.g., with modules of the mapping engine 136 presenting images of albedo maps 118 and shading maps 120, using user interface 140. Additionally, the operating system 134 can include components that perform various functions generally associated with an operating system, e.g., storage management and internal-device management.

Illustrative Components

Figure 2:
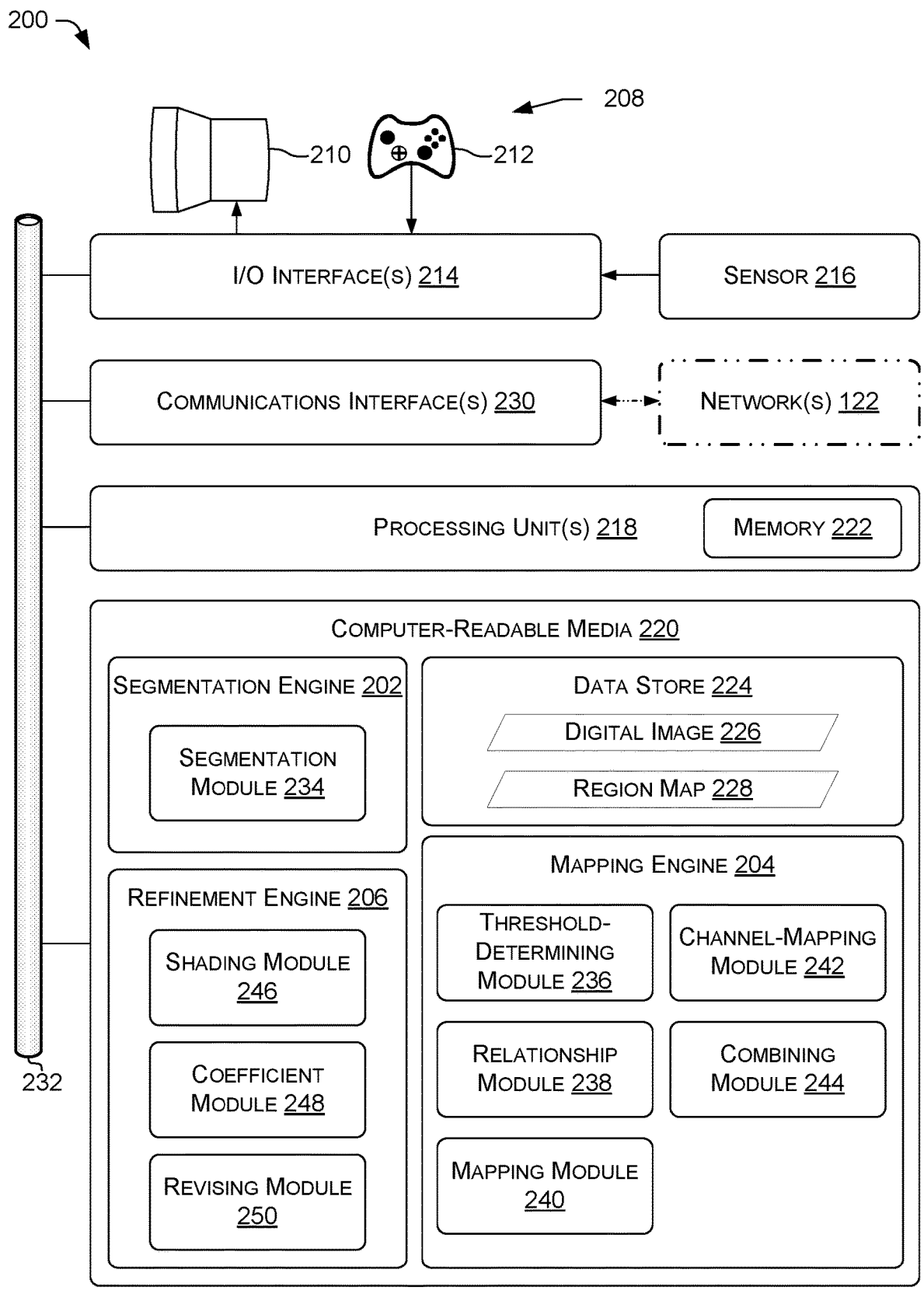
FIG. 2 is a block diagram depicting an example computing device configured to participate in image decomposition according to various examples described herein.

FIG. 2 is an illustrative diagram that shows example components of a computing device 200, which can represent computing device 102 or image source 104, and which can be configured to participate in image decomposition according to various examples described herein. Computing device 200 can implement a segmentation engine 202. Computing device 200 can implement a mapping engine 204, which can represent mapping engine 136, FIG. 1. Computing device 200 can implement a refinement engine 206, which can represent refinement engine 138, FIG. 1. Computing device 200 can include or be included in a system or device for producing a revised digital image as described herein.

In some examples, e.g., of a computing device 102 providing an image decomposition service, the computing device 200 can implement segmentation engine 202 and mapping engine 204 but not include sensor 216. In some examples, e.g., of an image source 104 such as a smartphone making use of an image decomposition service, the computing device 200 representing image source 104 can include sensor 216 but not implement segmentation engine 202 or mapping engine 204. In some examples, e.g., of a computing device 102 or image source 104 implementing both an image decomposition service and the use thereof, the computing device 200 can include sensor 216 and implement segmentation engine 202 and mapping engine 204.

Computing device 200 can include or be connected to a user interface 208, which can represent user interface 140. User interface 208 can include a display 210, e.g., configured to display input digital image(s) 106 or intrinsic image(s) such as albedo map 118 and shading map 120. Display 210 can include an organic light-emitting-diode (OLED) display, a liquid-crystal display (LCD), a cathode-ray tube (CRT), or another type of visual display. Display 210 can be a component of a touchscreen, or can include a touchscreen. User interface 208 can include various types of output devices described above with reference to user interface 140. In some examples, at least one of the mapping engine 204 and the refinement engine 206 is operatively coupled to the display 210 or another output device.

User interface 208 can include a user-operable input device 212 (graphically represented as a gamepad). User-operable input device 212 can include various types of input devices described above with reference to user interface 140. For example, user-operable input device 212 of image source 104 can include a shutter button or other control configured to receive commands to capture digital image 106 of scene 108.

Computing device 200 can further include one or more input/output (I/O) interfaces 214 by which computing device 200 can communicate with input, output, or I/O devices (for clarity, some not depicted). Examples of such devices can include components of user interface 208 such as user-operable input devices and output devices. Other examples of such devices include one or more sensors 216, which can represent sensor 142, FIG. 1, e.g., for capturing digital images 106, e.g., of a scene 108. Individual ones of the sensors 216 can be configured to output sensor data corresponding to at least one physical property, e.g., a physical property of an environment of the device, such as ambient light or a scene image. Some example sensors 216 include visible-light image sensors, infrared-light image sensors (e.g., $\lambda \in$[700 nm, 15 μm] or $\lambda \in$[700 nm, 1 mm]), or imaging devices that capture the flash image response of objects in the scene. Sensors 216 that provide data other than visible-light images are referred to herein as "supplemental sensors" that provide, e.g., "supplemental images" having "supplemental pixels." However, it is not required that supplemental sensors provide images; supplemental sensors can provide other types of supplemental values.

The computing device 200 can include one or more processing units 218, which can represent processing units 126. Processing units 218 can be operably coupled, e.g., via the I/O interface 214, to the user interface 208 and/or the sensors 216. Processing units 218 can be operably coupled to at least one computer-readable media 220, discussed below. Processing units 218 can include, e.g., processing unit types described above such as CPU-type or GPGPU-type processing units. In some examples, processing units 218 can include or be connected to a memory 222, e.g., a random-access memory (RAM) or cache.

The processing units 218 can be configured to execute modules of a plurality of modules, discussed below, on the computer-readable media 220, e.g., computer storage media. For example, the computer-executable instructions stored on the computer-readable media 220 can upon execution configure a computer such as a computing device 200 to perform operations described herein with reference to the modules of the plurality of modules, e.g., modules of the segmentation engine 202, mapping engine 204, or refinement engine 206. The modules stored in the computer-readable media 220 can include instructions that, when executed by the one or more processing units 218, cause the one or more processing units 218 to perform operations described below.

In the illustrated example, computer-readable media 220 includes a data store 224. Data store 224 can additionally or alternatively be embodied in whole or in part in memory 222. In some examples, data store 224 can include a first memory for storing a digital image 226, e.g., digital image 106, FIG. 1. The digital image can include, e.g., data of a plurality of pixels. The data of individual ones of the pixels can include respective values for individual ones of a plurality of color channels (planes), e.g., red (R), green (G), and blue (B) color channels; luma (Y), blue chroma (Cb), and red chroma (Cr) color channels; or other color organizations. In some examples, data store 224 can include a second memory for storing a region map 228, discussed below.

The computing device 200 can also include one or more communications interface(s) 230, which can represent communications interface 132. As such, the computing device 200 can have network capabilities. For example, the computing device 200 can exchange data with computing devices 102 or image sources 104 (e.g., laptops, computers, and/or servers) via one or more networks 122, such as the Internet.

In some examples, the processing units 218 can access the modules on the computer-readable media 220 via a bus 232, which can represent bus 130, FIG. 1. I/O interface 214 and communications interface 230 can also communicate with processing units 218 via bus 232.

The modules of the segmentation engine 202 stored on computer-readable media 220 can include one or more modules, e.g., shell modules, or application programming interface (API) modules, which are illustrated as a segmentation module 234.

The modules of the mapping engine 204 stored on computer-readable media 220 can include one or more modules, e.g., shell modules, or application programming interface (API) modules, which are illustrated as a threshold-determining module 236, a relationship module 238 a mapping module 240, a channel-mapping module 242, and a combining module 244.

The modules of the refinement engine 206 stored on computer-readable media 220 can include one or more modules, e.g., shell modules, or application programming interface (API) modules, which are illustrated as a shading module 246, a coefficient module 248, and a revising module 250.

In the segmentation engine 202, mapping engine 204, or refinement engine 206, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, one or more of the modules of the segmentation engine 202 and the mapping engine 204 can be combined in a single module that performs at least some of the example functions described below of those modules. In some examples, the following sets of modules can be combined in a single module that performs at least some of the example functions described below of those modules: the threshold-determining module 236, the relationship module 238, and the mapping module 240; the threshold-determining module 236, the relationship module 238, and the channel-mapping module 242; the shading module 246 and the coefficient module 248; or the revising module 250 and the combining module 244. These examples are not limiting and other combinations can be made of the modules described herein. In some examples, computer-readable media 220 can include a subset of the modules described herein.

Figure 3:
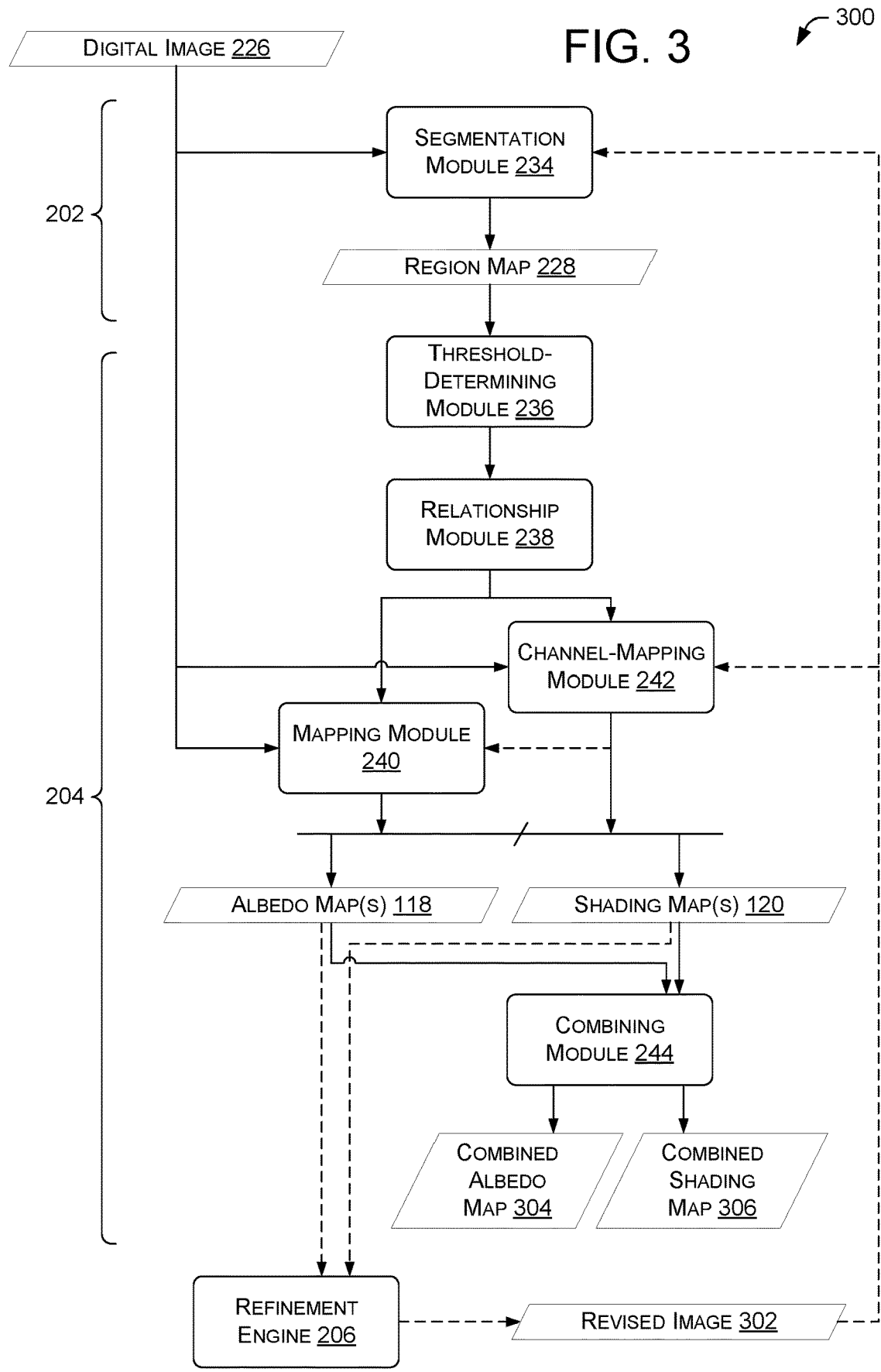
FIG. 3 is a dataflow diagram depicting example module interactions during image decomposition.

FIG. 3 is a dataflow diagram 300 illustrating example interactions between the modules illustrated in FIG. 2. In some examples, digital image 226 is processed by segmentation module 234 of segmentation engine 202 or mapping module 240 of mapping engine 204.

In some examples, a revised digital image 302 is produced as described below. In some of these examples, the revised digital image 302 can be further processed, e.g., to increase accuracy of the albedo map 118 or the shading map 120. For clarity of explanation, and without limitation, data paths discussed herein with reference to the revised digital image 302 are shown dashed. Lines with a transverse stroke represent buses, i.e., any of the inputs to such a line can provide data to any of the outputs of such a line.

In some examples, the segmentation module 234 can be configured to determine, based at least in part on color values of pixels of digital image 226, the region map 228 identifying a plurality of regions of the digital image and respective color values of the regions in the plurality of regions, or one or more respective color values of individual regions of the plurality of regions. Each region can have generally a single color and be considered to have generally a single albedo. Treating each region in place of the individual pixels in that region can significantly reduce the processing time and memory requirements of image decomposition. For example, neighboring regions with similar chromaticity values can also be considered as a single material with the same albedo value for each of the neighboring regions.

In some examples, the segmentation module 234 can be configured to filter the digital image to reduce the number of unique colors therein. For example, the segmentation module 234 can apply a mean-shift filter to the digital image 226. The mean-shift filter can have a spatial bandwidth $h_s$, e.g., of 5 and a range (color) bandwidth $h_r$, e.g., of 3. The mean-shift filtering can be carried out in various color spaces, such as those defined by the International Commission on Illumination (CIE) or the National Television System Committee (NTSC). Example color spaces that can be used include CIE L*a*b* (CIELAB), CIE L*u*v* (CIELUV, 1976), CIE Yu'v' (the CIE 1976 uniform coordinate scale, UCS, plus luminance Y), YIQ (NTSC 1953), sRGB, linear RGB, or other color spaces. Other filters for reducing the number of unique pixel values in an image can also be used. In some examples, gradient-based methods, e.g., thresholds on color-difference gradients across an image, can be used instead of or in addition to mean-shift filtering.

The segmentation module 234 can group areas, e.g., pixels of the filtered digital image, based at least in part on a color-difference grouping threshold to provide the regions of the plurality of regions in the region map 228 of the digital image 226. In some examples, the segmentation module 234 groups (e.g., clusters) neighboring pixels in the filtered image. The color-difference grouping threshold can include a Hamming distance of the bits in the pixel data (e.g., 24-bit R8G8B8 RGB or 16-bit R5G6B5 RGB), e.g., of <1 or <4. The color-difference grouping threshold can also or alternatively include a distance in a color space, e.g., a CIELAB $\Delta E^*$ of $\leq 1.0$.

In some examples, the segmentation module 234 is further configured to group the areas of the filtered digital image so that individual ones of the provided regions of the digital image have a size above a selected size threshold M. For example, the segmentation module 234 can disregard pixel clusters having fewer pixels than M, e.g., having fewer than 32 pixels. This can reduce the sensitivity of the decomposition procedure to spatial noise in the image. As a result of applying a threshold M>1, or due, e.g., to image content such as high-spatial-frequency noise, some pixels in the digital image 226 may not be included in any region. Those pixels are referred to herein as "ungrouped" pixels. In some examples, M=1, so each pixel is within a region. In some examples, each pixel in the digital image 226 is in at most one region.

In some examples, the segmentation module 234 can be configured to determine the respective color values of the regions. For example, the color value for a region can be the average color of pixels in that region. The average can be taken, e.g., per chromaticity coordinate or in a color space such as CIELAB or any other color space listed above. In some examples, the segmentation module 234 can be configured to determine respective color values of one or more of the ungrouped pixels.

In some examples, the relationship module 238 can be configured to determine a plurality of proximity relationships between individual ones of the regions. The proximity relationships can include, e.g., constraints on how the albedos or shadings of nearby groups are related.

As discussed below with reference to the mapping module 240, in some examples the albedo map 118 and the shading map 120 can be determined using mathematical optimization techniques that, e.g., minimize an energy function. The proximity relationships in some of these examples can include energy terms that drive the mathematical optimization towards preferred assignments of albedo and shading or away from non-preferred assignments. These energy terms are examples of constraints. There are many possible combinations of albedo and shading maps that correspond to the digital image 226, so the proximity relationships drive selection of which of those combinations will be provided. Using various proximity relationships herein can provide albedo and shading maps that are perceptually reasonable, e.g., that generally correspond to the way a human would perceive the scene 108 depicted in the digital image 226. In some examples, proximity relationships include mathematical expressions that measure the similarity (or lack thereof) between two parts of the digital image 226, e.g., two pixels or two regions, or between a part of the digital image 226 and a corresponding reference or value external to the digital image 226.

For example, an albedo map A and a shading map S can be determined for an input image I as in Eq. (1):

$$\arg\min_{A,S} E(A, S) \text{ where } I = AS \qquad (1)$$

In Eq. (1), E(A, S) can be a function of the form given in Eq. (2):

$$E(A, S) = \sum_{K=1}^{n} w_k R_k(A, S) \qquad (2)$$

for n weights $w_k$ and corresponding proximity relationships $R_k$. The proximity relationships can relate to, e.g., albedo, shading, supplemental values, or the determination accuracy of A and S.

In some examples, at least one proximity relationship $R_1$ relates to albedo and at least one other proximity relationship $R_2$ relates to shading. In these examples, the respective weights can be related as $w_1 > 95 w_2$, or $w_1 \approx 100 w_2$. In some examples, proximity relationships described herein can be categorized as, e.g., positional relationships (e.g., neighboring pixels in the digital image 226 are likely to have close 3-D spatial positions), shading relationships (e.g., close spatial positions often share similar shading), or albedo relationships (e.g., close spatial positions with similar chromaticity value often have the same material, thus the same albedo).

Throughout the following discussion, A(i) and S(i) refer to respective albedo and shading values for the $i^{th}$ region. In these examples, albedo map 118 includes respective albedo values A(i) for individual ones of the regions, and shading map 120 includes respective shading values S(i) for individual ones of the regions. In some examples, at least one of the proximity relationships expresses the constraint that I=AS, e.g., as given in Eq. (3):

$$R_1(A,S) = |A \cdot S - I| \qquad (3)$$

The product A·S in Eq. (3) is taken element-by-element (e.g., pixel-by-pixel or region-by-region).

In some examples, the relationship module 238 can be configured to select one or more groups of neighboring ones of the regions having respective color values separated by less than at least one of the color-difference thresholds. For example, the relationship module 238 can select a group including a first region of the plurality of regions and a second one of the plurality of regions. The first and second regions can have the respective color values separated by less than at least one of the color-difference thresholds. The color-difference thresholds can correspond to color differences in a color space such as CIELAB or any other color space listed above. Example color difference metrics include the $L^2$ norm $\|\bullet\|_2$, i.e., the Euclidean distance in a color space (e.g., $L^*a^*b^*$ or RGB), the $L^1$ norm $\|\bullet\|_1$ (Manhattan distance), and other $L^p$ norms in a color space. Other example color difference metrics include hue-angle difference, per-component or multi-component differences (e.g., CIELAB $\Delta C^*$, $\Delta L^*$, $\Delta a^*$, or $\Delta b^*$), and Hamming distance between digital representations of one or more components in a color representation or color space. One example of a color difference metric is CIE 1976 UCS $\Delta u'v'$. Given color values $\vec{C_r} = u'_r, v'_r$) for a region r, $\Delta u'v'$ for two regions a and b can be computed as in Eqs. (4) and (5):

$$\Delta u'v' = \sqrt{\Delta u'^2 + \Delta v'^2} \qquad (4)$$

$$\Delta u' = u'_a - u'_b; \Delta v' = v'_a - v'_b \qquad (5)$$

In some examples, the relationship module 238 can be configured to determine the at least one of the color-difference thresholds based at least in part on a peak color distance in the digital image, e.g., a range of colors along one or more dimension(s) in a color space, or a largest distance between two colors in the digital image 226. Eqs. (6) and (7) show an example using color values in the CIE 1976 UCS for each region.

$$U = \max_{all\ regions} u' - \min_{all\ regions} u' \qquad (6)$$

$$V = \max_{all\ regions} v' - \min_{all\ regions} v' \qquad (7)$$

One or more color-difference thresholds can then be determined as given in Eqs. (8) and (9):

$$t_s = p_s \min(U, V) \qquad (8)$$

$$t_p = p_p \min(U, V) \qquad (9)$$

where $t_s$ is a threshold for pixels in regions and $t_p$ is a threshold for ungrouped pixels. Values can be selected for parameters $p_s$ and $p_p$ to tune the performance of the algorithm.

In some examples, $$p_s = \frac{1}{16}.$$

In some examples, $$p_p = \frac{1}{32}.$$

Other values can be used. In some examples, different thresholds are selected for different color components, e.g., for the u' and v' directions. In some examples, $t_{s,u'} = p_{s,u'} U$ and $t_{s,v'} = p_{s,v'} V$, and likewise for $t_{p,u'}$ and $t_{p,v'}$. In some examples, $p_{s,u'} = p_{s,v'}$, e.g., having a value of $$\frac{1}{16}.$$

In some examples, $p_s$, $p_p$ values less than 1 are used to divide the u'v' space (or other color space, e.g., CIELAB a*b*) into a grid of cells of size inversely proportional to $p_s$ or $p_p$. In some examples, the color space is partitioned into cells, e.g., using a Voronoi decomposition from a set of reference colors in the color space. In some examples, the color space is partitioned into cells, e.g., based on supplemental information from an infrared image or an image captured under flash illumination. The supplemental information can be used to determine a chroma distribution of the albedo map, which can then be subdivided into cells, e.g., on a regular grid or based on gradients or other properties of the chroma distribution.

Some of the above-described examples select thresholds that can be applied anywhere in the color space, e.g., anywhere in the u'v' diagram. In some examples, the thresholds are correlated with, e.g., the relevant values of u' and v'. For example, in examples using the CIE 1931 xy chromaticity space, the threshold can be positively correlated with, e.g., proportional to, the y coordinate. This permits, e.g., compensating for perceptual nonuniformities in the color space. In some examples, the color data can be clustered in color space, e.g., using hierarchical clustering techniques, and thresholds determined as the color differences between the clusters.

These color-difference thresholds can then be used to select groups of neighboring ones of the regions. In some examples, for two regions a and b, if $|\vec{C_a} - \vec{C_b}| < t_s$, regions a and b form a group (the test can alternatively be satisfied for values to and including $t_s$). This can be performed for regions or ungrouped pixels; in some examples, the relationship module 238 can be configured to select one or more groups of neighboring ungrouped pixels having respective color values separated by less than at least one of the color-difference thresholds (e.g., $t_p$). In some examples dividing the color space into cells as noted above, the relationship module 238 can be configured to determine that two or more neighboring ones of the regions, or two or more neighboring ones of the ungrouped pixels, are separated by less than at least one of the color-difference thresholds if those regions or ungrouped pixels fall in the same cell in the color space.

In some examples, once the relationship module 238 has determined a plurality of the color-difference thresholds based at least in part the respective color values of a plurality of the regions and selected one or more groups of neighboring ones of the regions (e.g., a first region and a neighboring second region) having respective color values separated by less than corresponding ones of the color-difference thresholds, e.g., as described above, the relationship module 238 can determine, for individual ones of the selected groups, respective ones of the proximity relationships corresponding to differences between respective albedo values of the ones of the regions in that group. For example, the relationship module 238 can determine one of the plurality of proximity relationships corresponding to a difference between respective albedo values of a first region and a second region of the plurality of regions. The relationship module 238 can additionally or alternatively determine at least some of the proximity relationships based at least in part on respective color values of one or more ungrouped pixels of the digital image.

Continuing the example above, given regions a and b that have been selected as part of a group, the relationship module 238 can determine a proximity relationship $R_{a \to b}$ between regions a and b as in Eq. (10):

$$R_{a \to b}(A,S) = |A(a)-A(b)|^2 \tag{10}$$

That is, the proximity relationship is the squared difference between the albedo of region a and the albedo of region b. When used in a mathematical-optimization framework solving an equation similar to Eqs. (1) and (2), above, the proximity relationship $R_{a \to b}$ will drive towards a solution in which region a and region b have the same albedo.

In some examples, for images of textured objects, texture patches can be grouped by similarity. Proximity relationships can be determined that drive towards assigning the same albedo value to texture patches within the same group. Specifically, in some examples, the relationship module 238 can be configured to determine respective texture values of one or more of the regions. Texture values can include, e.g., peak spatial frequency(ies) of a texture, direction(s) of principal component axes of the texture, or other texture properties that can be determined from the digital image 226. The relationship module 238 can select one or more groups of ones of the regions, neighboring or otherwise, having respective texture values separated by less than one or more selected texture-difference thresholds, e.g., predetermined thresholds or percentages of a range, as discussed above with reference to color-difference thresholds. The relationship module 238 can determine, for individual ones of the selected groups, respective ones of the proximity relationships corresponding to differences between respective albedo values of the ones of the regions in that group.

In some examples, the relationship module 238 can be configured to select one or more groups of neighboring ones of the regions (or ungrouped pixels). For example, the relationship module 238 can select any or all of the groups (e.g., pairs, triplets, or quadruplets) of neighboring ones of the regions (or ungrouped pixels). The relationship module 238 can also or alternatively select, e.g., a pattern of such groups, groups extending substantially only along a particular direction (e.g., groups horizontally adjacent or vertically adjacent, but not both), randomly- or pseudorandomly-selected ones of such groups, or any combination thereof.

The relationship module 238 can determine, for individual ones of the selected groups, respective ones of the proximity relationships corresponding to the differences between the respective shading values of the ones of the regions in that group. Such proximity relationships will drive towards a solution to Eq. (1) in which the members of the selected groups (e.g., nearby regions) have similar shading. For example, the relationship module 238 can select a group including a first region of the plurality of regions and a neighboring second region of the plurality of regions, and determine one of the plurality of proximity relationships corresponding to a difference between the respective shading values of the first region and the second region of the plurality of regions. One example relationship $R_{a \to b,s}$, for a group including regions a and b is given in Eq. (11):

$$R_{a \to b,s}(A,S) = |S(a)-S(b)|^2 \tag{11}$$

In some examples, at least one sensor 216 provides a supplemental image. The relationship module 238 can be configured to determine respective supplemental values of the regions, or the ungrouped pixels, from the supplemental pixels corresponding to those regions or ungrouped pixels. In some of these examples, the relationship module 238 can be configured to select one or more groups of the regions, neighboring or otherwise, having respective supplemental values separated by less than corresponding ones of a plurality of supplemental-value-difference thresholds. Supplemental-value-difference thresholds can be predetermined or computed, e.g., as discussed above with reference to color-difference thresholds. The relationship module 238 can then determine, for individual ones of the selected groups, respective ones of the proximity relationships corresponding to the differences between respective albedo values of the ones of the regions in that group. In some examples, the relationship module 238 can select a group including a first region of the plurality of regions and a second region of the plurality of regions, wherein the first region and the second region have respective supplemental values separated by less than a supplemental-value-difference threshold, and determine one of the plurality of proximity relationships corresponding to a difference between respective albedo values of the first region and the second region of the plurality of regions.

For example, if two regions a and b have similar flash or infrared response, the relationship module 238 can determine a proximity relationship $R_{a \to b,u}$ between regions a and b as in Eq. (12):

$$R_{a \to b,u} = |A(a) - A(b)|^2 \qquad (12)$$

That is, regions a and b, having similar response in the supplemental image, are likely to have similar albedo.

In some examples, when geometry information about an object 110 is available, e.g., from a 3-D scanner, that information can be used to drive the solution to Eqs. (1) and (2). Specifically, in some examples, the relationship module 238 can be configured to receive geometry values of one or more objects 110 depicted in the digital image 226. For example, the geometry values can include the directions of normals of the surfaces of objects 110 for pixels or regions of the digital image 226. The relationship module 238 can select one or more groups of ones of the regions, neighboring or otherwise, having respective geometry values separated by less than one or more geometry-difference thresholds. For example, the geometry-difference thresholds can include limits on the angle between the normals of two regions, e.g., 15°. The relationship module 238 can then determine, for individual ones of the selected groups, respective ones of the proximity relationships corresponding to differences between respective shading values of the ones of the regions in that group. In some examples, the relationship module 238 is further configured to determine geometry values of the object 110 based at least in part on the digital image 226 or the lighting coefficients. For example, relationship module 238 can determine normals from the shading map assuming that the shading information is derived from light sources described in the lighting coefficients, e.g. using the proportionality between reflectance of a Lambertian surface and the cosine of the angle between the normal and the light source.

In some examples, the mapping module 240 can be configured to produce an albedo map and a shading map based at least in part on the digital image 226 and one or more color-difference thresholds. In some examples, the mapping module 240 is further configured to produce the albedo map and the shading map based at least in part on the region map 228 determined by segmentation module 234. In some examples, the mapping module 240 is further configured to determine the albedo map 118 and the shading map 120 that together correspond to the digital image 226 based at least in part on proximity relationships such as those discussed above, e.g., in the plurality of proximity relationships.

For example, the mapping module 240 can solve Eqs. (1) and (2) using a mathematical optimization technique, e.g., a maximization or minimization technique. The example proximity relationships above can be used with a minimization technique; counterpart relationships can be used for a maximization technique. The mapping module 240 can use, e.g., conjugate gradient descent or other minimization techniques to determine the A and S matrices that provide a preferred fit to the input image I.

In some examples, the mapping module 240 can be configured to provide a single albedo map 118 and a single shading map 120 for a given color image, e.g., an RGB image. In some examples, the channel-mapping module 242 can be configured to provide per-channel albedo and shading maps. In some examples, the channel-mapping module 242 can be configured to produce respective albedo maps and respective shading maps for individual color channels (e.g., R, G, and B) of the digital image 226 based at least in part on the digital image and at least one color-difference threshold. In some examples, the channel-mapping module 242 can be configured to produce at least one of the albedo maps or at least one of the shading maps based at least in part on the region map 228. For example, the channel-mapping module 242 can perform mathematical optimization of Eqs. (1) and (2) with proximity relationships, e.g., as discussed above with reference to the relationship module 238, one or more times for each color channel (color plane). One or more color channels can use regions defined in a single region map 228, or one or more color channels can use regions defined in respective, channel-specific region maps 228.

In some examples, the albedo map 118 and the shading map 120 from the mapping module 240, or the two or more per-channel albedo maps 118 and shading maps 120 from the channel-mapping module 242, are provided to the refinement engine 206. The refinement engine 206 can be configured to produce a revised digital image 226 by adjusting the digital image. Various examples of the operation of the refinement engine 206 are discussed below and with reference to FIG. 4.

In some examples, the revised digital image 302 is provided to the segmentation module 234, the mapping module 240, or the channel-mapping module 242. Processing described herein can be iterated, e.g., to produce a second, third, or subsequent revised digital image 302. Iteration can be carried out, e.g., until the difference between two successive revised digital images 302 is less than a selected threshold, or for a selected number of iterations. In some of these examples, the segmentation module 234 can be configured to produce a revised region map 228 based at least in part on the revised digital image 302.

In some of these examples, the segmentation module 234 and the mapping module 240 can be further configured to cooperatively produce a revised albedo map 118 and a revised shading map 120 based at least in part on the revised digital image 302. In some examples using the channel-mapping module 242, the segmentation module 234 and the channel-mapping module 242 can be configured to cooperatively produce a plurality of revised albedo maps 118 and a plurality of revised shading maps 120 based at least in part on the revised digital image 302.

In some examples using the channel-mapping module 242, the system can further include the mapping module 240 configured to configured to produce a revised albedo map 118 and a revised shading map 120 based at least in part on the revised region map 228 and at least one color-value threshold. For example, mapping and refinement can be performed per-channel one or more times using channel-mapping module 242 and refinement engine 206 respectively, operating on or producing multiple albedo maps 118 and shading maps 120. A single albedo map 118 and a single shading map 120 can then be produced, e.g., using mapping module 240, as an output of the processing. This is indicated by the dashed arrow from channel-mapping module 242 to mapping module 240.

Additionally or alternatively, in some examples using the channel-mapping module 242, the combining module 244 can be configured to produce a combined albedo map 304 based at least in part on the plurality of albedo maps 118 (or revised albedo maps) and to produce a combined shading map 306 based at least in part on the plurality of shading maps 120 (or revised shading maps). For example, the albedo maps 118 can include one albedo map 118 for each color channel in the digital image 226 (e.g., R, G, and B). The combining module 244 can assemble the combined albedo map 304 having the albedo maps 118 as the respective color channels thereof, and likewise for the combined shading map 306 having the shading maps 120 as the respective color channels thereof, In some examples, e.g., discussed below with reference to coefficient module 248, a plurality of lighting coefficients are determined based at least in part on the digital image, and those coefficients are used in producing the revised digital image 302. These coefficients can be used in determining the revised albedo map 118 and the revised shading map 120. Specifically, in some examples, the mapping module 240 can be configured to determine, for individual ones of the regions, respective shading contributions corresponding to the lighting coefficients. In some examples, the mapping module 240 can be configured to determine, for a first region of the plurality of regions, a shading contribution corresponding to the lighting coefficients; determine a proximity relationship corresponding to a difference between the shading values of the first region and the corresponding determined shading contribution; and determine the albedo map and the shading map that together correspond to the revised digital image based at least in part on the determined proximity relationship.

The mapping module 240 can determine, for individual ones of the regions, respective second proximity relationships corresponding to differences between respective shading values of those regions and the corresponding determined shading contributions of those regions. An example second proximity relationship $R_{a,s2}$ for a region a is given in Eq. (13):

$$R_{a,s2}=|S(a)-S_{LC}(a)|^2 \tag{13}$$

where $S_{LC}(a)$ is the determined shading contribution of region a corresponding to the lighting coefficients. Eq. (13) is an example of a proximity relationship involving a single region (S(a)) and a reference ($S_{LC}(a)$) rather than two regions. Other proximity relationships can be defined involving a single region and a reference.

The mapping module 240 can determine the albedo map 118 and the shading map 120 that together correspond to the revised digital image based at least in part on the determined second proximity relationships. The second proximity relationships drive towards solutions in which the determined shading map 120 corresponds to the determined lighting coefficients.

Figure 4:
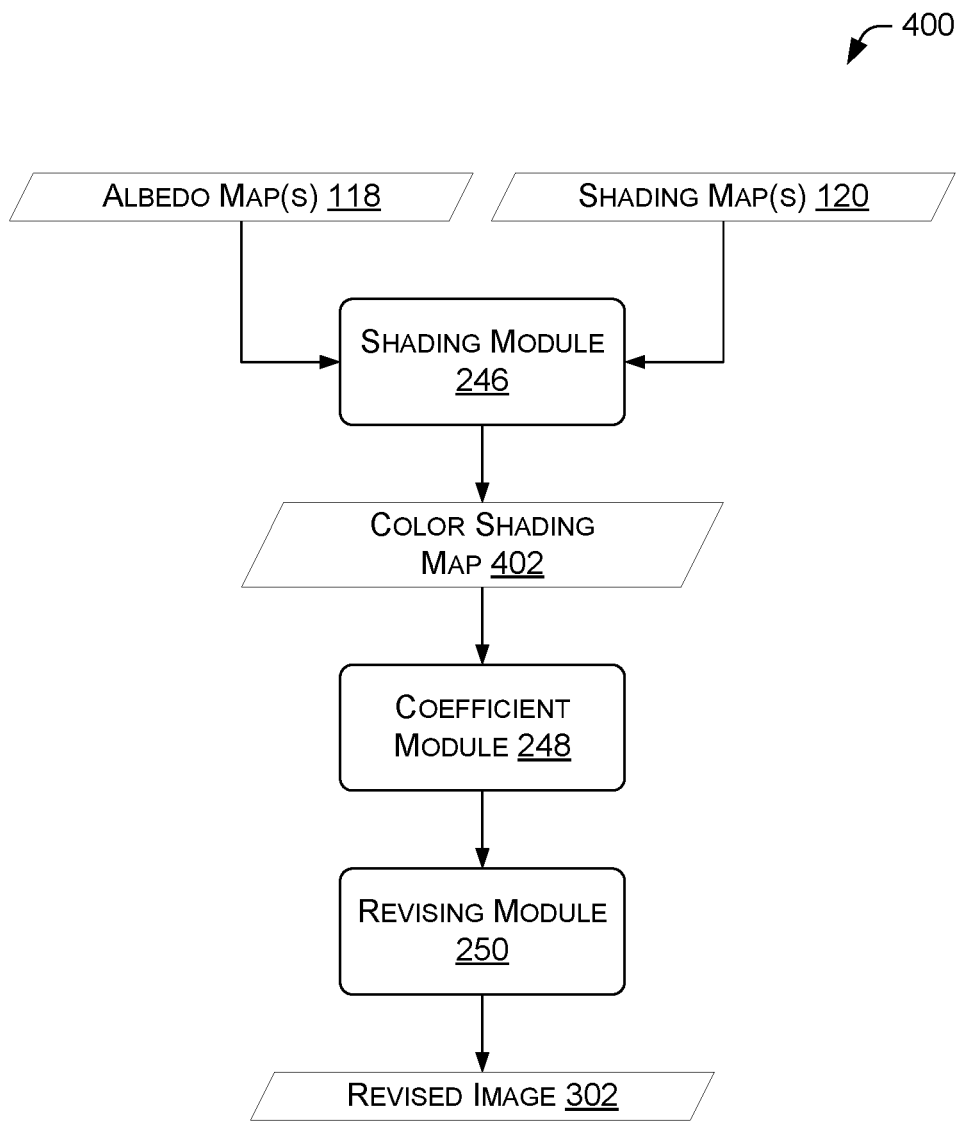
FIG. 4 is a dataflow diagram depicting example module interactions during refinement of a decomposition of an image.

FIG. 4 is a dataflow diagram 400 illustrating some examples of refinement, e.g., as discussed above with reference to refinement engine 206.

In some examples, the shading module 246 can be configured to determine a color shading map 402 based at least in part on the albedo map and the digital image. The color shading map 402 can include information of chromatic light sources 112 illuminating an object 110. For example, a sphere illuminated by two different-colored light sources on opposite hemispheres will exhibit two smooth gradients of color in the digital image 106, one for each light source. The color shading map 402 can include the information about the gradients without the color of the object. This can permit determining the texture or other albedo parameters of the object unconfounded by the colors of chromatic light sources.

In some examples, the shading module 246 can be configured to determine the color shading map 402 by determining a reduced-color albedo map based at least in part on the albedo map and then determine the color shading map 402 based at least in part on content of the digital image not included in the reduced-color albedo map. In some examples, object 110 is, e.g., a man-made likely to have relatively few discrete colors in its albedo. Removing a small number of colors from the albedo map permits determining the color(s) of chromatic light source(s) 112 illuminating the object 110. For input image I and albedo map 118 A, the reduced-color albedo map can be denoted $A_r$, and the color shading map 402 $S_c$ can be determined as $S_c=I/A_r$.

In some examples, the shading module 246 can be configured to determine the reduced-color albedo map by clustering values of the albedo map in a selected color space, e.g., RGB or CIELAB. In some of these examples, the color shading map 402 includes the variation or other residue not explained by the located clusters. The clustered values can include albedo values of regions or albedo values of pixels. Example clustering techniques that can be used include hierarchical clustering, k-means clustering, mean-shift clustering, or expectation-maximization clustering.

In some of these examples, the shading module 246 can be configured to determine a plurality of candidate reduced-color albedo maps using k-means clustering for respective, different values of k. The shading module 246 can be further configured to select as the reduced-color albedo map the one of the determined candidate reduced-color albedo maps having a lowest reconstruction error. This permits, e.g., determining the color shading map 402 without overestimating or underestimating the number of colors in the object 110.

In some examples, a reduced-color albedo map $A_{r,k}$ is determined for each value of k, and a corresponding shading map $S_{r,k}$ is determined, e.g., from $A_{r,k}$ and the input image I. A score F(k) is then determined for each k according to Eqs. (14) and (15):

$$F(k) = E(k) + \lambda k \tag{14}$$

$$E(k) = \sum_{i=1}^{n} |S_{r,k}(i) \, A_{r,k}(i) - I(i)| \tag{15}$$

for n pixels or regions, where, e.g., $\lambda=5\times10^{-4}$ or another value. E(k) represents the inaccuracy in reproducing I from the reduced-color albedo map $A_{r,k}$, and $\lambda$ penalizes higher values of k to inhibit overestimating k. Once k has been determined, the color shading map 402 can be determined using I and $A_{r,k}$, e.g., as $S_{r,k}=I/A_{r,k}$.

In some examples using the channel-mapping module 242, the shading module 246 can be configured to produce a color shading map 402 based at least in part on the respective shading maps 120. In some examples, the channel-mapping module 242 provides three shading maps 120, one each for R, G, and B. The color shading map 402 can be provided by assembling a color image having the shading maps 120 as the respective color channels thereof (e.g., R, G, and B, respectively).

In some examples, the coefficient module 248 can be configured to determine a plurality of lighting coefficients based at least in part on the color shading map 402. In some examples, at least two of the plurality of lighting coefficients correspond to respective, substantially orthogonal functions, e.g., spherical harmonic functions or other basis functions, e.g., orthonormal basis functions.

Accordingly, in some examples, the coefficient module 248 can be configured to determine at least some of the plurality of lighting coefficients based at least in part on fitting a set of spherical-harmonic functions to the color shading map. In some examples, the lighting coefficients can be determined by fitting without prior knowledge of the geometry of the scene 108 or the light source(s) 112. In some examples, the digital image 226 is filtered or otherwise preprocessed to remove specular highlights before producing the albedo map(s) 118 and the shading map(s) 120. In some examples, the albedo map(s) 118, the shading map(s) 120, or the color shading map 402 are filtered or otherwise preprocessed to remove specular highlights before determining the lighting coefficients.

In some examples, spherical-harmonic (SH) functions can be used to model diffuse lighting. This can reduce the number of parameters used to model the lighting from several per pixel to only a small number per digital image 226. For example, lighting modeled using the first three orders of SH functions can be represented using about 10-20 coefficients per digital image 226.

In some examples, the revising module 250 can be configured to produce a revised digital image 226 by adjusting the digital image based at least in part on the lighting coefficients. In some examples, the revising module 250 can be configured to remove lighting from the digital image based at least in part on the lighting coefficients. For example, a shading or lighting image $S_i$ can be rendered using the lighting coefficients. The rendered lighting can be removed from the input image I to provide the revised digital image 226 $I_r = I/S_i$. For example, the color of the lighting can be isolated and then removed from the scene. Specifically, in some examples, the revising module 250 can be configured to produce the revised digital image by rendering a shading image corresponding to the plurality of lighting coefficients and removing the shading image from the digital image.

In some examples, low-spatial-frequency lighting (e.g., wide area light) is removed from the image. This can provide revised digital image 226 having smoother or reduced-amplitude shading while retaining albedo differences and sharp shadows. This can permit more accurately determining albedo and shading. This can also provide increased robustness, since shading not accurately modeled by the lighting coefficients can be retained in the image for subsequent processing.

Illustrative Processes

Figure 5:
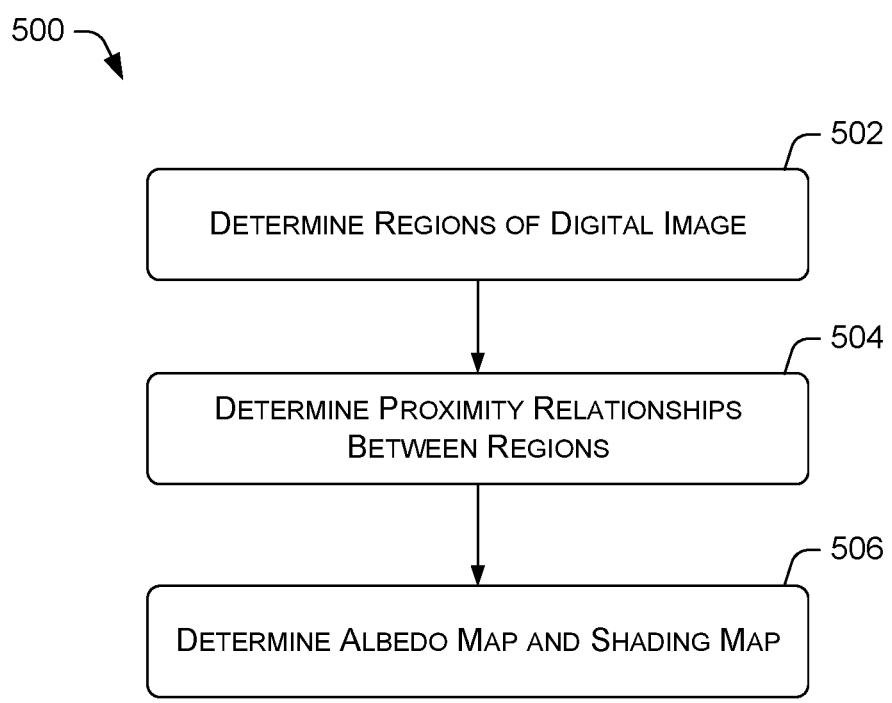
FIG. 5 is a flow diagram that illustrates example processes for decomposing digital images.
Figure 6:
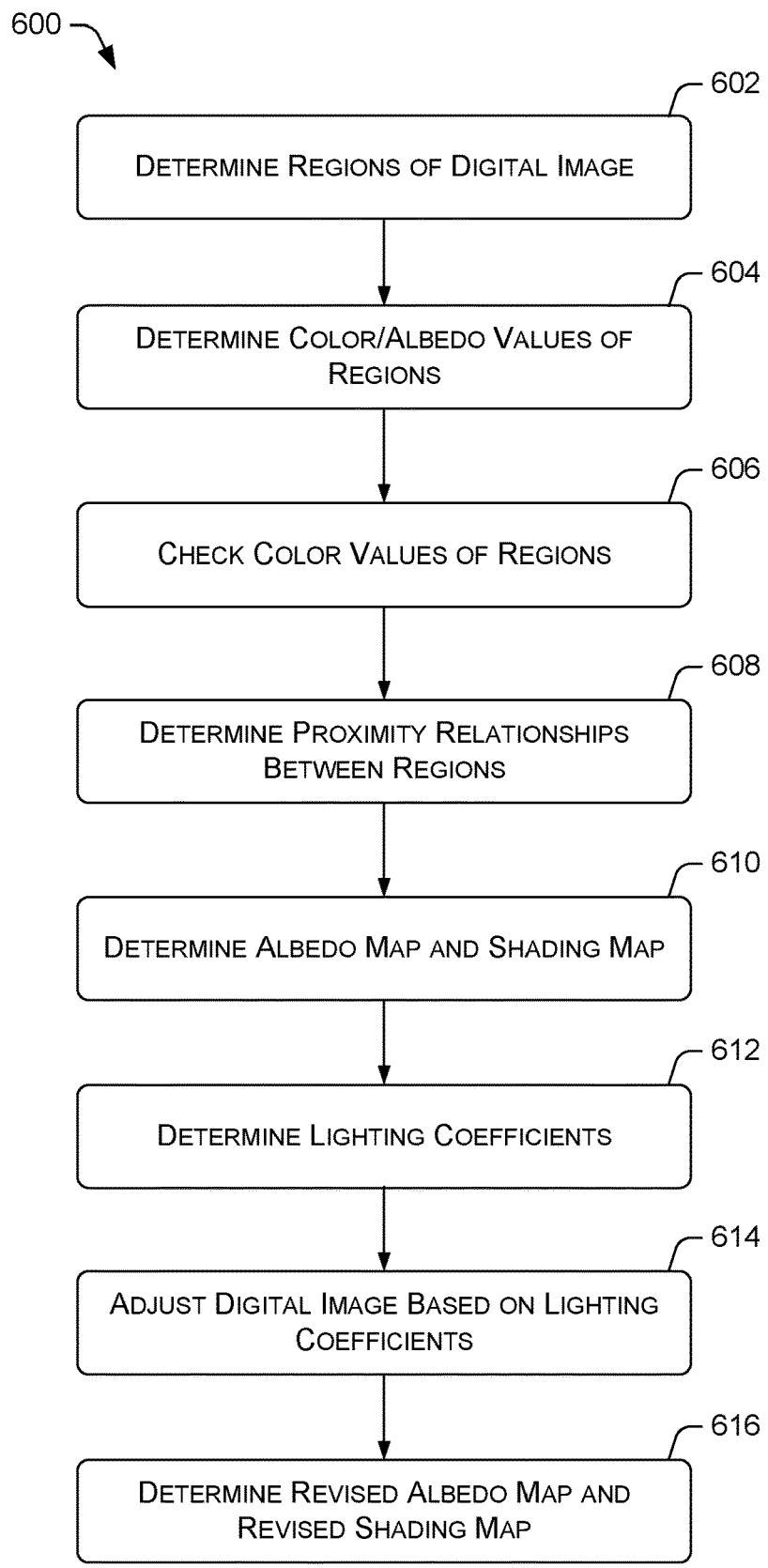
FIG. 6 is a flow diagram that illustrates example processes for decomposing digital images.

FIG. 5 is a flow diagram that illustrates an example process 500 for decomposing a digital image using a computing device, e.g., computing device 200, FIG. 2. Example functions shown in FIG. 5 and other flow diagrams and example processes herein can be implemented on or otherwise embodied in one or more computing devices 102 or image sources 104, e.g., using software running on such devices. For the sake of illustration, the example process 500 is described below with reference to processing unit 218 and other components of computing device 200, FIG. 2, that can carry out or participate in the steps of the exemplary method. However, other processing units such as processing unit 126 and/or other components of computing devices 102 or image sources 104 can carry out steps of described example processes such as process 500. Similarly, example methods shown in FIG. 6 are also not limited to being carried out by any particularly-identified components.

The order in which the operations are described in each example flow diagram or process is not intended to be construed as a limitation, and any number of the described operations can be combined in any order and/or in parallel to implement each process. Moreover, the operations in FIGS. 5 and 6 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

Still referring to FIG. 5, at block 502, a plurality of regions of a digital image are determined. The digital image can be, e.g., the digital image 226, FIG. 2. This can be done, e.g., as described above with reference to segmentation module 234.

At block 504, one or more proximity relationships between individual ones of the regions are determined. This can be done, e.g., as described above with reference to threshold-determining module 236 or relationship module 238.

At block 506, an albedo map and a shading map are determined based at least in part on the digital image 226, the region map, and the proximity relationships. This can be done, e.g., as described above with reference to mapping module 240 or channel-mapping module 242.

FIG. 6 is a flow diagram that illustrates an example process 600 for decomposing a digital image using a computing device, e.g., computing device 200, FIG. 2. The process can make use of one or more color-difference thresholds, e.g., as described above with reference to relationship module 238.

At block 602, a plurality of regions of a digital image is determined. This can be done, e.g., as described above with reference to block 502.

At block 604, in some examples, respective color values of at least some of the regions, e.g., of at least two regions of the plurality of regions, are determined. This can be done, e.g., as described above with reference to segmentation module 234.

At block 606, in some examples, it is determined that the at least two regions of the plurality of regions have respective color values separated by less than a color-difference threshold. In some examples, block 606 can include selecting the at least two regions having respective color values separated by less than the color-difference threshold. This can be done, e.g., as described above with reference to block 504.

At block 608, one or more proximity relationships between individual ones of the regions, e.g., between at least two regions of the plurality of regions, are determined. This can be done, e.g., as described above with reference to block 504.

In some examples using block 604, at least one of the one or more proximity relationships are determined including an albedo relationship between two of the regions having the respective color values separated by less than at least one of the color-difference thresholds. This can be done, e.g., as described above with reference to Eq. (10). In some examples, at block 608, one of the proximity relationships is determined and corresponds to a difference the between respective albedo values of the at least two regions of the plurality of regions.

At block 610, an albedo map and a shading map are determined based at least in part on the digital image 226, the region map, and the proximity relationships. This can be done, e.g., as described above with reference to block 506.

At block 612, a plurality of lighting coefficients is determined. The coefficients can be determined, e.g., based at least in part on the determined albedo map or the determined shading map. This can be done, e.g., as described above with reference to coefficient module 248.

At block 614, the digital image is adjusted based at least in part on the lighting coefficients. For example, the digital image can be adjusted to remove lighting. This can be done, e.g., as described above with reference to revising module 250.

At block 616, a revised albedo map and a revised shading map are determined based at least in part on the revised digital image. This can be done, e.g., as described above with reference to mapping module 240 or channel-mapping module 242.

Illustrative Results

Figure 7:
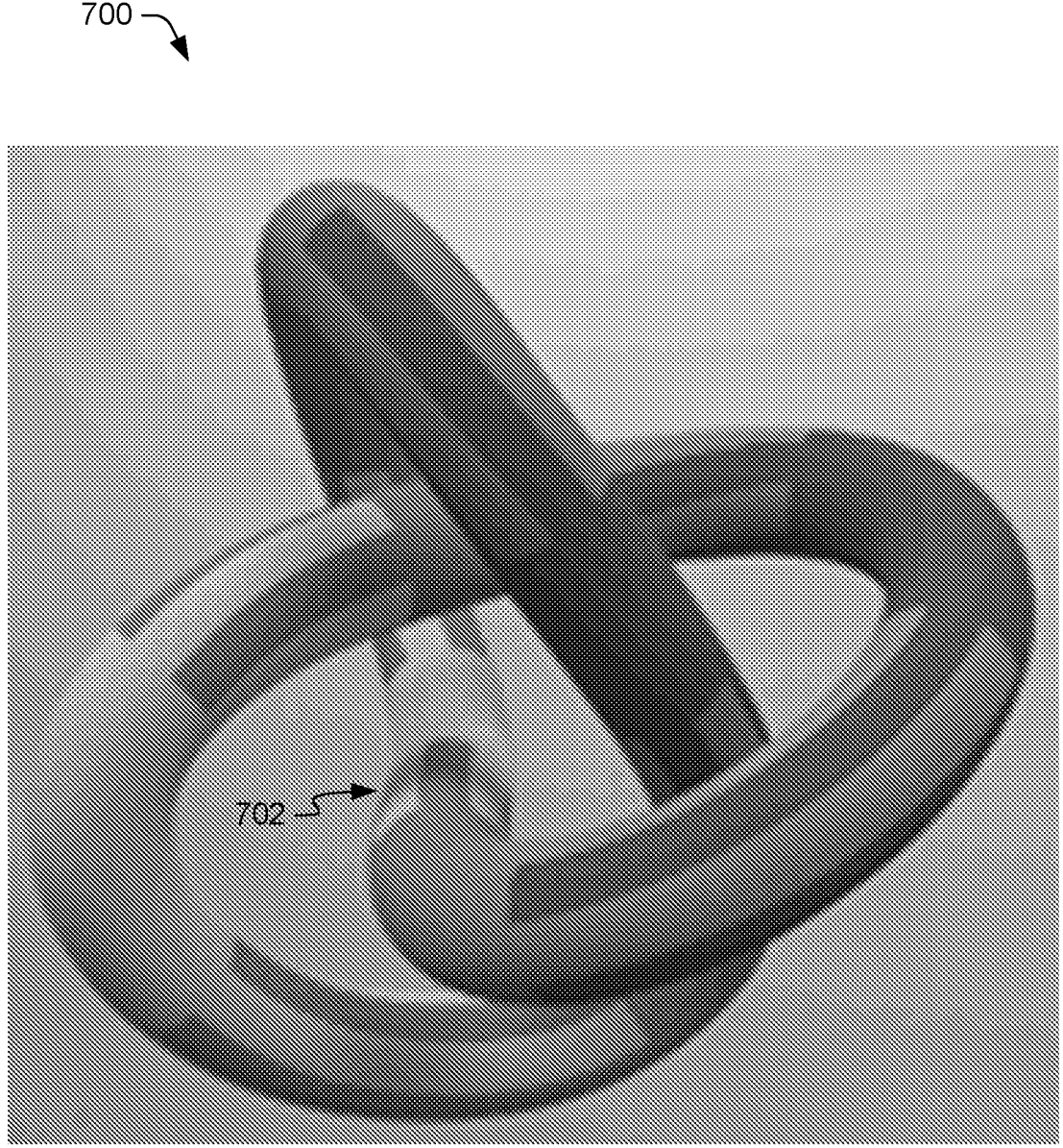
FIG. 7 shows a graphical representation of a digital image that was rendered.

FIG. 7 shows a graphical representation 700 of a digital image that was rendered. The rendering depicts a closed knot having on its surface various interleaved color strips and solid color regions. Area 702 of the representation 700 is darker because of a shadow cast by an upper portion of the knot onto area 702.

Figure 8:
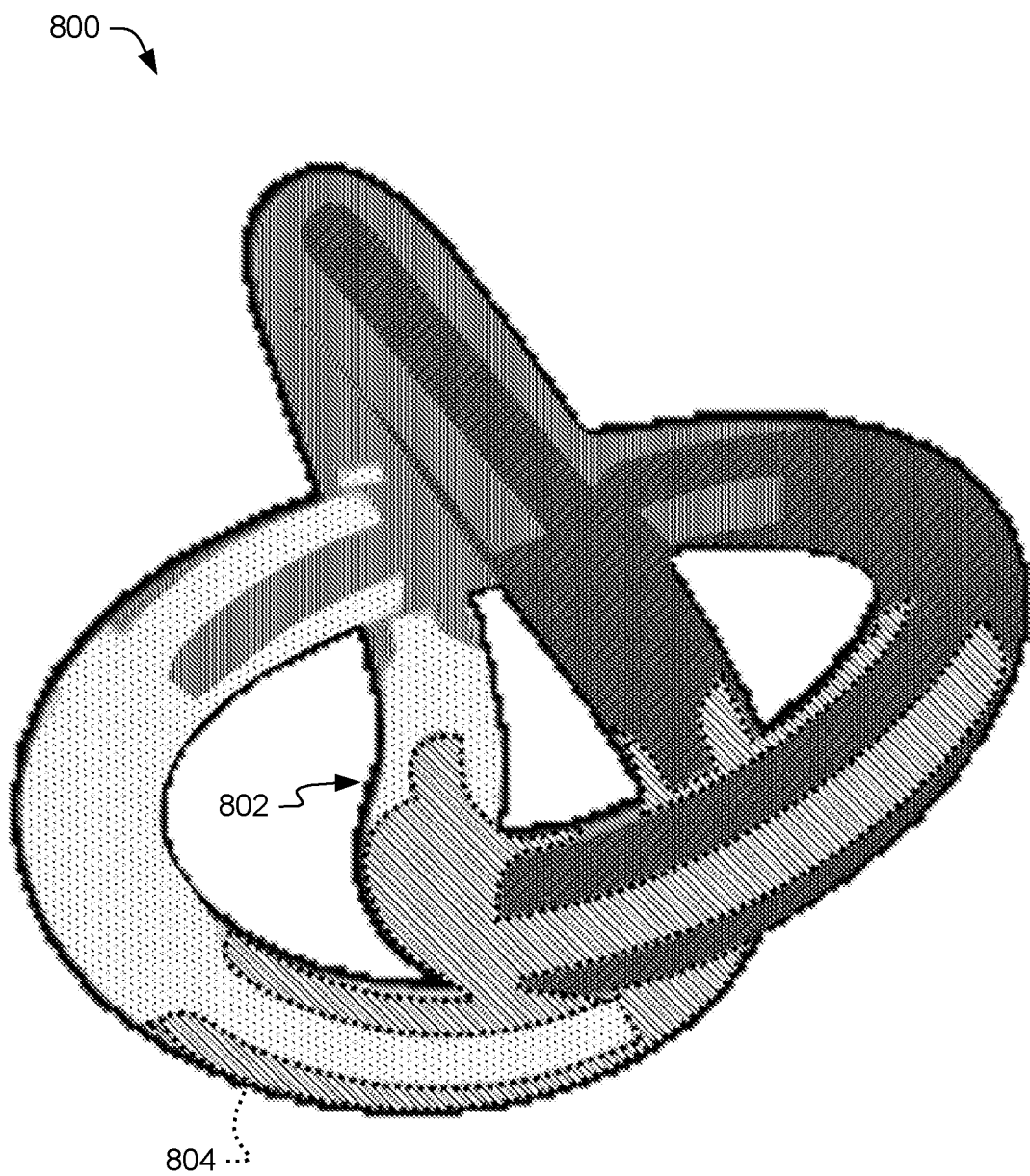
FIG. 8 shows a graphical representation of an example albedo image corresponding to the digital image represented in FIG. 7.

FIG. 8 shows a graphical representation 800 of an albedo image that was determined according to various examples herein. Hatching patterns graphically represent the surface colors. Area 802 shows the albedo information without the shadow visible in area 702. Stippled boundary 804 shows coordinates of a boundary representation of an example area of substantially constant albedo. The albedo information can be represented as a list of coordinate points of boundary 804 instead of or in addition to as an albedo image (depicted as representation 800).

Figure 9:
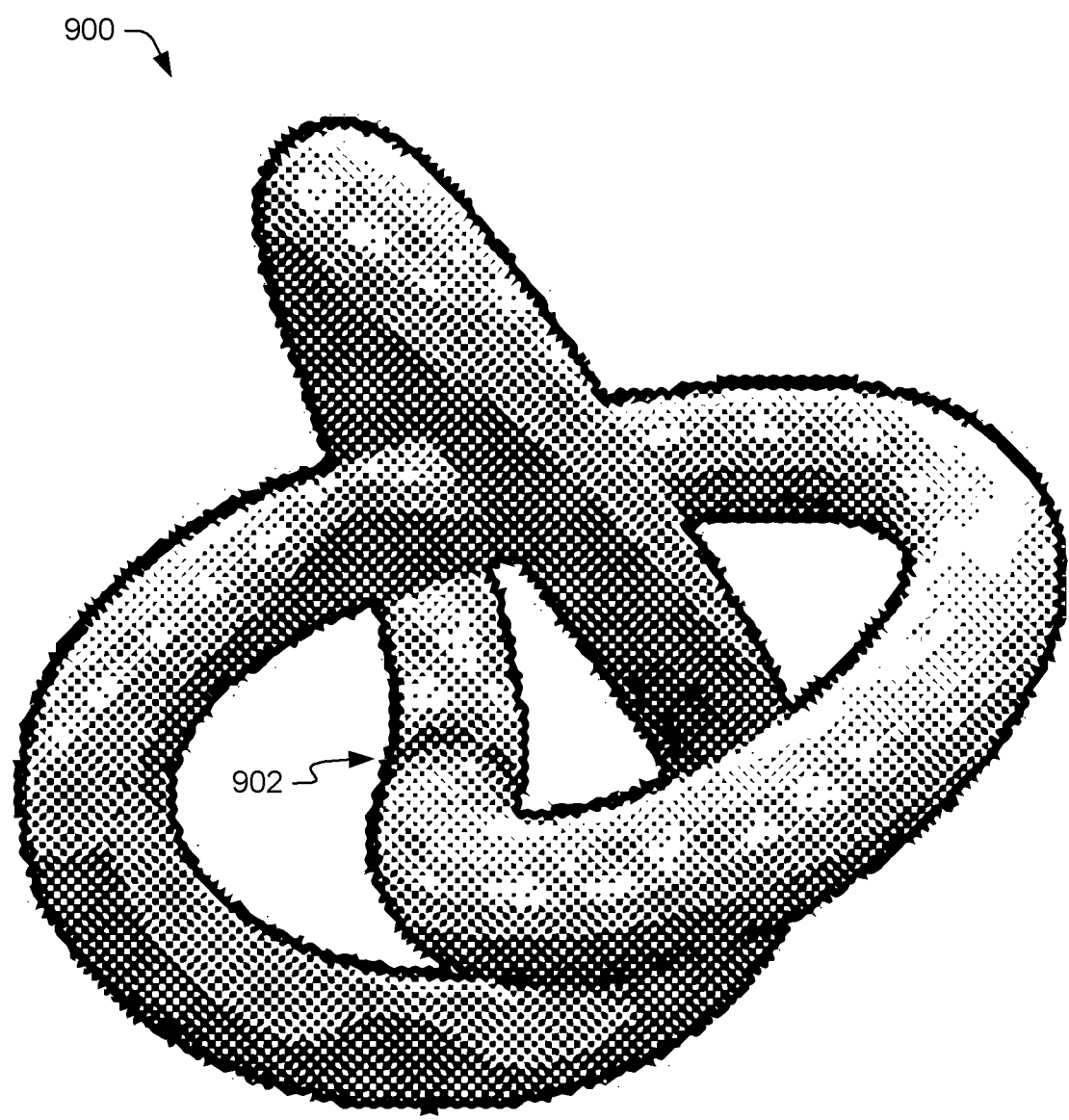
FIG. 9 shows a graphical representation of an example shading image corresponding to the digital image represented in FIG. 7.

FIG. 9 shows a graphical representation 900 of a shading image that was determined according to various examples herein. Area 902 shows the shadow information from area 702 but not the albedo information.

Example Clauses

A: A system or device comprising: a medium having thereon a plurality of modules; and a processing unit operably coupled to the computer-readable medium and configured to execute modules of the plurality of modules comprising: a mapping module configured to produce an albedo map and a shading map based at least in part on a digital image and one or more color-difference thresholds; and a refinement module configured to: determine a color shading map based at least in part on the albedo map and the digital image; determine a plurality of lighting coefficients based at least in part on the color shading map; and produce a revised digital image by adjusting the digital image based at least in part on the lighting coefficients.

B: A system or device as paragraph A recites, wherein: the plurality of modules further comprises a segmentation module configured to determine, based at least in part on color values of pixels of a digital image, a region map identifying a plurality of regions of the digital image and respective color values of the plurality of regions; and the mapping module is further configured to produce the albedo map and the shading map based at least in part on the region map.

C: A system or device as paragraph B recites, wherein the segmentation module is configured to: filter the digital image to reduce the number of unique colors therein; and group areas of the filtered digital image based at least in part on a color-difference grouping threshold to provide the plurality of regions of the digital image.

D: A system or device as paragraph B or C recites, wherein the mapping module is configured to: determine a plurality of proximity relationships between individual regions of the plurality of regions; and determine the albedo map and the shading map that together correspond to the digital image based at least in part on the plurality of proximity relationships, wherein the albedo map includes respective albedo values for individual regions of the plurality of regions and the shading map includes respective shading values for individual regions of the plurality of regions.

E: A system or device as paragraph D recites, wherein the mapping module is configured to: select a group including a first region of the plurality of regions and a neighboring second region of the plurality of regions, wherein the first and second regions have respective color values separated by less than at least one of the color-difference thresholds; and determine one of the plurality of proximity relationships corresponding to a difference between respective albedo values of a first region and a second region of the plurality of regions.

F: A system or device as paragraph D or E recites, wherein the mapping module is further configured to: select a group including a first region of the plurality of regions and a second region of the plurality of regions, wherein the first region and the second region have respective supplemental values separated by less than a supplemental-value-difference threshold; and determine one of the plurality of proximity relationships corresponding to a difference between respective albedo values of the first region and the second region of the plurality of regions.

G: A system or device as any of paragraphs D-F recites, wherein the mapping module is configured to: select a group including a first region of the plurality of regions and a neighboring second region of the plurality of regions; and determine one of the plurality of proximity relationships corresponding to a difference between the respective shading values of the first region and the second region of the plurality of regions.

H: A system or device as any of paragraphs D-G recites, further comprising providing at least some of the proximity relationships based at least in part on respective color values of one or more ungrouped pixels of the digital image.

I: A system or device as any of paragraphs B-H recites, wherein the segmentation module and the mapping module are further configured to cooperatively produce a revised albedo map and a revised shading map based at least in part on the revised digital image.

J: A system or device as any of paragraphs B-I recites, further comprising: a first memory for storing the digital image; and a second memory for storing the region map.

K: A system or device as any of paragraphs B-J recites, wherein the segmentation module is further configured to group the areas of the filtered digital image so that individual ones of the provided regions of the digital image have respective sizes above a selected size threshold.

L: A system or device as any of paragraphs B-K recites, wherein the mapping module is further configured to: determine a plurality of the one or more color-difference thresholds based at least in part the respective color values of a plurality of the regions; select one or more groups of neighboring ones of the regions having respective color values separated by less than corresponding ones of the color-difference thresholds; and determine, for individual ones of the selected groups, respective ones of the proximity relationships corresponding to differences between respective albedo values of the ones of the regions in that group.

M: A system or device as any of paragraphs B-L recites, wherein the mapping module is further configured to: determine respective texture values of one or more of the regions; select one or more groups of ones of the regions having respective texture values separated by less than one or more selected texture-difference thresholds; and determine, for individual ones of the selected groups, respective ones of the proximity relationships corresponding to differences between respective albedo values of the ones of the regions in that group.

N: A system or device as any of paragraphs B-M recites, wherein the mapping module is further configured to: select one or more groups of ones of the regions having respective geometry values separated by less than one or more geometry-difference thresholds; and determine, for individual ones of the selected groups, respective ones of the proximity relationships corresponding to differences between respective shading values of the ones of the regions in that group.

O: A system or device as any of paragraphs B-N recites, further comprising: a first memory for storing the digital image having data of a plurality of pixels, the data of individual ones of the pixels including respective values for individual ones of a plurality of color channels; and a second memory for storing the region map.

P: A system or device as any of paragraphs A-O recites, wherein the mapping module is configured to produce the revised albedo map and the revised shading map by: determining, for a first region of the plurality of regions, a shading contribution corresponding to the lighting coefficients; determining a proximity relationship corresponding to a difference between the shading values of the first region and the corresponding determined shading contribution; and determining the albedo map and the shading map that together correspond to the revised digital image based at least in part on the determined proximity relationship.

Q: A system or device as any of paragraphs A-P recites, wherein the refinement module is configured to: determine a reduced-color albedo map based at least in part on the albedo map; and determine the color shading map based at least in part on content of the digital image not included in the reduced-color albedo map.

R: A system or device as paragraph Q recites, wherein the refinement module is configured to determine the reduced-color albedo map by clustering values of the albedo map in a selected color space.

S: A system or device as paragraph Q or R recites, wherein the refinement module is further configured to determine a plurality of candidate reduced-color albedo maps using k-means clustering for respective, different values of k, and to select as the reduced-color albedo map the one of the determined candidate reduced-color albedo maps having a lowest reconstruction error.

T: A system or device as any of paragraphs A-S recites, wherein the refinement module is configured to determine the plurality of lighting coefficients based at least in part on fitting a set of spherical-harmonic functions to the color shading map.

U: A system or device as any of paragraphs A-T recites, wherein at least two of the plurality of lighting coefficients correspond to respective, substantially orthogonal functions.

V: A system or device as any of paragraphs A-U recites, wherein the mapping module is further configured to determine the at least one of the one or more color-difference thresholds based at least in part on a peak color distance in the digital image.

W: A system or device as any of paragraphs A-V recites, wherein the refinement module is configured to remove lighting from the digital image based at least in part on the lighting coefficients.

X: A system or device as any of paragraphs A-W recites, wherein the refinement module is configured to produce the revised digital image by rendering a shading image corresponding to the plurality of lighting coefficients and removing the shading image from the digital image.

Y: A system or device as any of paragraphs A-X recites, further comprising a sensor configured to capture the digital image of a scene.

Z: A system or device as any of paragraphs A-Y recites, wherein the digital image is two-dimensional.

AA: A system or device comprising: a computer-readable medium having thereon a plurality of modules; and a processing unit operably coupled to the computer-readable medium and configured to execute modules of the plurality of modules comprising: a channel-mapping module configured to produce respective albedo maps and respective shading maps for individual color channels of a digital image based at least in part on the digital image and one or more color-difference thresholds; and a refinement module configured to: produce a color shading map based at least in part on the respective shading maps; determine a plurality of lighting coefficients based at least in part on the color shading map; and produce a revised digital image by adjusting the digital image based at least in part on the lighting coefficients.

AB: A system or device as paragraph AA recites, wherein: the plurality of modules further comprises a segmentation module configured to determine, based at least in part on color values of pixels of the digital image, the region map identifying a plurality of regions of the digital image and a respective color value of an individual region of the plurality of regions; and the channel-mapping module is further configured to produce at least one of the albedo maps or at least one of the shading maps based at least in part on the region map.

AC: A system or device as paragraph AB recites, wherein: the segmentation module and the channel-mapping module are further configured to cooperatively produce a plurality of revised albedo maps and a plurality of revised shading maps based at least in part on the revised digital image; and the refinement module is configured to produce a combined albedo map based at least in part on the plurality of revised albedo maps and to produce a combined shading map based at least in part on the plurality of revised shading maps.

AD: A system or device as paragraph AC recites, wherein the channel-mapping module is configured to produce the plurality of revised albedo maps and the plurality of revised shading maps by: determining, for a first region of the plurality of regions, a shading contribution corresponding to the lighting coefficients; determining a proximity relationship corresponding to a difference between the shading values of the first region and the corresponding determined shading contribution; and determining the albedo map and the shading map that together correspond to the revised digital image based at least in part on the determined proximity relationship.

AE: A system or device as any of paragraphs AB-AD recites, wherein the segmentation module is further configured to produce a revised region map based at least in part on the revised digital image and the system further comprises a mapping module configured to produce a revised albedo map and a revised shading map based at least in part on the revised region map and at least one color-value threshold.

AF: A system or device as any of paragraphs AB-AE recites, wherein the segmentation module is configured to: filter the digital image to reduce the number of unique colors therein; and group areas of the filtered digital image based at least in part on a color-difference grouping threshold to provide the plurality of regions of the digital image.

AG: A system or device as any of paragraphs AB-AF recites, wherein the channel-mapping module is configured to: determine a plurality of proximity relationships between individual regions of the plurality of regions; and determine the respective albedo maps and the respective shading maps that together correspond to the respective individual color channels of the digital image based at least in part on the plurality of proximity relationships, wherein the albedo maps include respective albedo values for individual regions of the plurality of regions and the shading maps includes respective shading values for individual regions of the plurality of regions.

AH: A system or device as paragraph AG recites, wherein the channel-mapping module is configured to: select a group including a first region of the plurality of regions and a neighboring second region of the plurality of regions, wherein the first and second regions have respective color values separated by less than at least one of the color-difference thresholds; and determine one of the plurality of proximity relationships corresponding to a difference between respective albedo values of a first region and a second region of the plurality of regions.

AI: A system or device as paragraph AG or AH recites, wherein the channel-mapping module is further configured to: select a group including a first region of the plurality of regions and a second region of the plurality of regions, wherein the first region and the second region have respective supplemental values separated by less than a supplemental-value-difference threshold; and determine one of the plurality of proximity relationships corresponding to a difference between respective albedo values of the first region and the second region of the plurality of regions.

AJ: A system or device as any of paragraphs AG-AI recites, wherein the channel-mapping module is configured to: select a group including a first region of the plurality of regions and a neighboring second region of the plurality of regions; and determine one of the plurality of proximity relationships corresponding to a difference between the respective shading values of the first region and the second region of the plurality of regions.

AK: A system or device as any of paragraphs AG-AJ recites, further comprising providing at least some of the proximity relationships based at least in part on respective color values of one or more ungrouped pixels of the digital image.

AL: A system or device as any of paragraphs AB-AK recites, further comprising: a first memory for storing the digital image; and a second memory for storing the region map.

AM: A system or device as any of paragraphs AB-AL recites, wherein the segmentation module is further configured to group the areas of the filtered digital image so that individual ones of the provided regions of the digital image have respective sizes above a selected size threshold.

AN: A system or device as any of paragraphs AB-AM recites, wherein the mapping module is further configured to: determine a plurality of the one or more color-difference thresholds based at least in part the respective color values of a plurality of the regions; select one or more groups of neighboring ones of the regions having respective color values separated by less than corresponding ones of the color-difference thresholds; and determine, for individual ones of the selected groups, respective ones of the proximity relationships corresponding to differences between respective albedo values of the ones of the regions in that group.

AO: A system or device as any of paragraphs AB-AN recites, wherein the mapping module is further configured to: determine respective texture values of one or more of the regions; select one or more groups of ones of the regions having respective texture values separated by less than one or more selected texture-difference thresholds; and determine, for individual ones of the selected groups, respective ones of the proximity relationships corresponding to differences between respective albedo values of the ones of the regions in that group.

AP: A system or device as any of paragraphs AB-AO recites, wherein the mapping module is further configured to: select one or more groups of ones of the regions having respective geometry values separated by less than one or more geometry-difference thresholds; and determine, for individual ones of the selected groups, respective ones of the proximity relationships corresponding to differences between respective shading values of the ones of the regions in that group.

AQ: A system or device as any of paragraphs AB-AP recites, further comprising: a first memory for storing the digital image having data of a plurality of pixels, the data of individual ones of the pixels including respective values for individual ones of a plurality of color channels; and a second memory for storing the region map.

AR: A system or device as any of paragraphs AA-AQ recites, wherein the refinement module is configured to: determine a reduced-color albedo map based at least in part on the albedo map; and determine the color shading map based at least in part on content of the digital image not included in the reduced-color albedo map.

AS: A system or device as paragraph AR recites, wherein the refinement module is configured to determine the reduced-color albedo map by clustering values of the albedo map in a selected color space.

AT: A system or device as paragraph AR or AS recites, wherein the refinement module is further configured to determine a plurality of candidate reduced-color albedo maps using k-means clustering for respective, different values of k, and to select as the reduced-color albedo map the one of the determined candidate reduced-color albedo maps having a lowest reconstruction error.

AU: A system or device as any of paragraphs AA-AT recites, wherein the refinement module is configured to determine the plurality of lighting coefficients based at least in part on fitting a set of spherical-harmonic functions to the color shading map.

AV: A system or device as any of paragraphs AA-AU recites, wherein at least two of the plurality of lighting coefficients correspond to respective, substantially orthogonal functions.

AW: A system or device as any of paragraphs AA-AV recites, wherein the mapping module is further configured to determine the at least one of the one or more color-difference thresholds based at least in part on a peak color distance in the digital image.

AX: A system or device as any of paragraphs AA-AW recites, wherein the refinement module is configured to remove lighting from the digital image based at least in part on the lighting coefficients.

AY: A system or device as any of paragraphs AA-AX recites, wherein the refinement module is configured to produce the revised digital image by rendering a shading image corresponding to the plurality of lighting coefficients and removing the shading image from the digital image.

AZ: A system or device as any of paragraphs AA-AY recites, further comprising a sensor configured to capture the digital image of a scene.

BA: A system or device as any of paragraphs AA-AZ recites, wherein the digital image is two-dimensional.

BB: A method, comprising: determining a plurality of regions of a digital image; determining one or more proximity relationships between at least two regions of the plurality of regions; and determining an albedo map and a shading map based at least in part on the digital image, the plurality of regions, and the proximity relationships.

BC: A method as paragraph BB recites, further comprising: determining a plurality of lighting coefficients based at least in part on the determined albedo map or the determined shading map; and adjusting the digital image based at least in part on the lighting coefficients.

BD: A method as paragraph BC recites, further comprising: determining a revised albedo map and a revised shading map based at least in part on the revised digital image.

BE: A method as paragraph BC or BD recites, wherein at least two of the plurality of lighting coefficients correspond to respective, substantially orthogonal functions.

BF: A method as any of paragraphs BC-BE recites, wherein the adjusting the digital image includes removing lighting from the digital image based at least in part on the lighting coefficients.

BG: A method as any of paragraphs BC-BF recites, further comprising rendering a shading image corresponding to the plurality of lighting coefficients, wherein the adjusting the digital image includes removing the shading image from the digital image.

BH: A method as any of paragraphs BC-BG recites, wherein the determining the plurality of lighting coefficients includes determining a color shading map based at least in part on the albedo map and the digital image and determining at least some of the plurality of lighting coefficients based at least in part on the color shading map.

BI: A method as any of paragraphs BB-BH recites, further comprising: determining respective color values of the at least two regions of the plurality of regions; determining the at least two regions of the plurality of regions have respective color values separated by less than a color-difference threshold; and determining one of the proximity relationships corresponding to a difference the between respective albedo values of the at least two regions of the plurality of regions.

BJ: A method as paragraph BI recites, further comprising determining the color-difference threshold based at least in part on a peak color distance in the digital image.

BK: A method as any of paragraphs BB-BJ recites, wherein the determining the plurality of regions is based at least in part on one or more color-difference thresholds.

BL: A method as any of paragraphs BB-BK recites, further comprising determining respective color values of the plurality of regions.

BM: A method as paragraph BL recites, further comprising filtering the digital image to reduce the number of unique colors therein; and grouping areas of the filtered digital image based at least in part on a color-difference grouping threshold to provide the plurality of regions of the digital image.

BN: A method as paragraph BL or BM recites, further comprising determining a plurality of proximity relationships, including the one or more proximity relationships, between individual regions of the plurality of regions; and determining the albedo map and the shading map that together correspond to the digital image based at least in part on the plurality of proximity relationships, wherein the albedo map includes respective albedo values for individual regions of the plurality of regions and the shading map includes respective shading values for individual regions of the plurality of regions.

BO: A method as paragraph BN recites, further comprising selecting a group including a first region of the plurality of regions and a neighboring second region of the plurality of regions, wherein the first and second regions have respective color values separated by less than at least one of the color-difference thresholds; and determining one of the plurality of proximity relationships corresponding to a difference between respective albedo values of a first region and a second region of the plurality of regions.

BP: A method as paragraph BN or BO recites, further comprising selecting a group including a first region of the plurality of regions and a second region of the plurality of regions, wherein the first region and the second region have respective supplemental values separated by less than a supplemental-value-difference threshold; and determining one of the plurality of proximity relationships corresponding to a difference between respective albedo values of the first region and the second region of the plurality of regions.

BQ: A method as any of paragraphs BN-BP recites, further comprising selecting a group including a first region of the plurality of regions and a neighboring second region of the plurality of regions; and determining one of the plurality of proximity relationships corresponding to a difference between the respective shading values of the first region and the second region of the plurality of regions.

BR: A method as any of paragraphs BB-BQ recites, wherein the determining the revised shading map includes determining, for a first region of the plurality of regions, a shading contribution corresponding to the lighting coefficients; determining a proximity relationship corresponding to a difference between the shading values of the first region and the corresponding determined shading contribution; and determining the albedo map and the shading map that together correspond to the revised digital image based at least in part on the determined proximity relationship.

BS: A method as any of paragraphs BB-BR recites, further comprising determining a reduced-color albedo map based at least in part on the albedo map; and determining the color shading map based at least in part on content of the digital image not included in the reduced-color albedo map.

BT: A method as paragraph BS recites, further comprising determining the reduced-color albedo map by clustering values of the albedo map in a selected color space.

BU: A method as paragraph BS or BT recites, further comprising determining a plurality of candidate reduced-color albedo maps using k-means clustering for respective, different values of k, and selecting as the reduced-color albedo map the one of the determined candidate reduced-color albedo maps having a lowest reconstruction error.

BV: A method as any of paragraphs BB-BU recites, further comprising determining the plurality of lighting coefficients based at least in part on fitting a set of spherical-harmonic functions to the color shading map.

BW: A method as any of paragraphs BB-BV recites, further comprising determining respective albedo maps and respective shading maps for individual color channels of a digital image based at least in part on the digital image and one or more color-difference thresholds.

BX: A method as paragraph BX recites, further comprising producing a color shading map based at least in part on the respective shading maps; determining a plurality of lighting coefficients based at least in part on the color shading map; and producing a revised digital image by adjusting the digital image based at least in part on the lighting coefficients.

BY: A method as paragraph BW or BX recites, further comprising determining at least one of the albedo maps or at least one of the shading maps based at least in part on the plurality of regions.

BZ: A method as paragraph BY recites, further comprising determining a plurality of revised albedo maps and a plurality of revised shading maps based at least in part on the revised digital image; determining a combined albedo map based at least in part on the plurality of revised albedo maps; and determining a combined shading map based at least in part on the plurality of revised shading maps.

CA: A method as paragraph BY or BZ recites, further comprising determining a revised region map based at least in part on the revised digital image and determining a revised albedo map and a revised shading map based at least in part on the revised region map and at least one color-value threshold.

CB: A method as any of paragraphs BB-CA recites, further comprising capturing the digital image of a scene using a sensor.

CC: A method as any of paragraphs BB-CB recites, wherein the digital image is two-dimensional.

CD: A method as any of paragraphs BB-CC recites, further comprising: storing the digital image in a first memory; and storing the region map in a second memory.

CE: A method as any of paragraphs BB-CD recites, wherein the determining the plurality of regions of the digital image includes grouping areas of the filtered digital image so that individual ones of the plurality of regions of the digital image have respective sizes above a selected size threshold.

CF: A method as any of paragraphs BB-CE recites, further comprising: determining a plurality of color-difference thresholds based at least in part the respective color values of a plurality of the regions; selecting one or more groups of neighboring ones of the regions having respective color values separated by less than corresponding ones of the color-difference thresholds; and determining, for individual ones of the selected groups, respective ones of the proximity relationships corresponding to differences between respective albedo values of the ones of the regions in that group.

CG: A method as any of paragraphs BB-CF recites, further comprising: determining respective texture values of one or more of the regions; selecting one or more groups of ones of the regions having respective texture values separated by less than one or more selected texture-difference thresholds; and determining, for individual ones of the selected groups, respective ones of the proximity relationships corresponding to differences between respective albedo values of the ones of the regions in that group.

CH: A method as any of paragraphs BB-CG recites, further comprising: selecting one or more groups of ones of the regions having respective geometry values separated by less than one or more geometry-difference thresholds; and determining, for individual ones of the selected groups, respective ones of the proximity relationships corresponding to differences between respective shading values of the ones of the regions in that group.

CI: A method as any of paragraphs BB-CH recites, further comprising: storing the digital image in a first memory, the digital image having data of a plurality of pixels, the data of individual ones of the pixels including respective values for individual ones of a plurality of color channels; and storing the region map in a second memory.

CJ: A method as any of paragraphs BB-CI recites, further comprising providing at least some of the proximity relationships based at least in part on respective color values of one or more ungrouped pixels of the digital image.

CK: A computer-readable medium, e.g., a computer storage medium, having thereon computer-executable instructions, the computer-executable instructions upon execution configuring a computer to perform operations as any of any of paragraphs BB-CJ recites.

CL: A device comprising: a processor; and a computer-readable medium, e.g., a computer storage medium, having thereon computer-executable instructions, the computer-executable instructions upon execution by the processor configuring the device to perform operations as any of any of paragraphs BB-CJ describe.

CM: A system or device comprising: means for processing; and means for storing having thereon computer-executable instructions, the computer-executable instructions including means to configure the device to carry out a method as any of any of paragraphs BB-CJ describe.

CN: A system or device, comprising: means for determining a plurality of regions of a digital image; means for determining one or more proximity relationships between at least two regions of the plurality of regions; and means for determining an albedo map and a shading map based at least in part on the digital image, the plurality of regions, and the proximity relationships.

CO: A system or device as paragraph CN recites, further comprising: means for determining a plurality of lighting coefficients based at least in part on the determined albedo map or the determined shading map; and means for adjusting the digital image based at least in part on the lighting coefficients.

CP: A system or device as paragraph CO recites, further comprising: means for determining a revised albedo map and a revised shading map based at least in part on the revised digital image.

CQ: A system or device as paragraph CO or CP recites, wherein at least two of the plurality of lighting coefficients correspond to respective, substantially orthogonal functions.

CR: A system or device as any of paragraphs CO-CQ recites, wherein the means for adjusting the digital image includes means for removing lighting from the digital image based at least in part on the lighting coefficients.

CS: A system or device as any of paragraphs CO-CR recites, further comprising means for rendering a shading image corresponding to the plurality of lighting coefficients, wherein the means for adjusting the digital image includes means for removing the shading image from the digital image.

CT: A system or device as any of paragraphs CO-CS recites, wherein the means for determining the plurality of lighting coefficients includes means for determining a color shading map based at least in part on the albedo map and the digital image and means for determining at least some of the plurality of lighting coefficients based at least in part on the color shading map.

CU: A system or device as any of paragraphs CN-CT recites, further comprising: means for determining respective color values of the at least two regions of the plurality of regions; means for determining the at least two regions of the plurality of regions have respective color values separated by less than a color-difference threshold; and means for determining one of the proximity relationships corresponding to a difference the between respective albedo values of the at least two regions of the plurality of regions.

CV: A system or device as paragraph CU recites, further comprising means for determining the color-difference threshold based at least in part on a peak color distance in the digital image.

CW: A system or device as any of paragraphs CN-CV recites, wherein the means for determining the plurality of regions operate based at least in part on one or more color-difference thresholds.

CX: A system or device as any of paragraphs CN-CW recites, further comprising means for determining respective color values of the plurality of regions.

CY: A system or device as paragraph CX recites, further comprising means for filtering the digital image to reduce the number of unique colors therein; and means for grouping areas of the filtered digital image based at least in part on a color-difference grouping threshold to provide the plurality of regions of the digital image.

CZ: A system or device as paragraph CX or CY recites, further comprising means for determining a plurality of proximity relationships, including the one or more proximity relationships, between individual regions of the plurality of regions; and means for determining the albedo map and the shading map that together correspond to the digital image based at least in part on the plurality of proximity relationships, wherein the albedo map includes respective albedo values for individual regions of the plurality of regions and the shading map includes respective shading values for individual regions of the plurality of regions.

DA: A system or device as paragraph CZ recites, further comprising means for selecting a group including a first region of the plurality of regions and a neighboring second region of the plurality of regions, wherein the first and second regions have respective color values separated by less than at least one of the color-difference thresholds; and means for determining one of the plurality of proximity relationships corresponding to a difference between respective albedo values of a first region and a second region of the plurality of regions.

DB: A system or device as paragraph CZ or DA recites, further comprising means for selecting a group including a first region of the plurality of regions and a second region of the plurality of regions, wherein the first region and the second region have respective supplemental values separated by less than a supplemental-value-difference threshold; and means for determining one of the plurality of proximity relationships corresponding to a difference between respective albedo values of the first region and the second region of the plurality of regions.

DC: A system or device as any of paragraphs CZ-DB recites, further comprising means for selecting a group including a first region of the plurality of regions and a neighboring second region of the plurality of regions; and means for determining one of the plurality of proximity relationships corresponding to a difference between the respective shading values of the first region and the second region of the plurality of regions.

DD: A system or device as any of paragraphs CN-DC recites, wherein the means for determining the revised shading map includes means for determining, for a first region of the plurality of regions, a shading contribution corresponding to the lighting coefficients; means for determining a proximity relationship corresponding to a difference between the shading values of the first region and the corresponding determined shading contribution; and means for determining the albedo map and the shading map that together correspond to the revised digital image based at least in part on the determined proximity relationship.

DE: A system or device as any of paragraphs CN-DD recites, further comprising means for determining a reduced-color albedo map based at least in part on the albedo map; and means for determining the color shading map based at least in part on content of the digital image not included in the reduced-color albedo map.

DF: A system or device as paragraph DE recites, further comprising means for determining the reduced-color albedo map by clustering values of the albedo map in a selected color space.

DG: A system or device as paragraph DE or DF recites, further comprising means for determining a plurality of candidate reduced-color albedo maps using k-means clustering for respective, different values of k, and means for selecting as the reduced-color albedo map the one of the determined candidate reduced-color albedo maps having a lowest reconstruction error.

DH: A system or device as any of paragraphs CN-DG recites, further comprising means for determining the plurality of lighting coefficients based at least in part on fitting a set of spherical-harmonic functions to the color shading map.

DI: A system or device as any of paragraphs CN-DH recites, further comprising means for determining respective albedo maps and respective shading maps for individual color channels of a digital image based at least in part on the digital image and one or more color-difference thresholds.

DJ: A system or device as paragraph DJ recites, further comprising means for producing a color shading map based at least in part on the respective shading maps; means for determining a plurality of lighting coefficients based at least in part on the color shading map; and means for producing a revised digital image by adjusting the digital image based at least in part on the lighting coefficients.

DK: A system or device as paragraph DI or DJ recites, further comprising means for determining at least one of the albedo maps or at least one of the shading maps based at least in part on the plurality of regions.

DL: A system or device as paragraph DK recites, further comprising means for determining a plurality of revised albedo maps and a plurality of revised shading maps based at least in part on the revised digital image; means for determining a combined albedo map based at least in part on the plurality of revised albedo maps; and means for determining a combined shading map based at least in part on the plurality of revised shading maps.

DM: A system or device as paragraph DK or DL recites, further comprising means for determining a revised region map based at least in part on the revised digital image and means for determining a revised albedo map and a revised shading map based at least in part on the revised region map and at least one color-value threshold.

DN: A system or device as any of paragraphs CN-DM recites, further comprising a sensor for capturing the digital image of a scene.

DO: A system or device as any of paragraphs CN-DN recites, wherein the digital image is two-dimensional.

DP: A system or device as any of paragraphs CN-DO recites, further comprising: means for storing the digital image in a first memory; and means for storing the region map in a second memory.

DQ: A system or device as any of paragraphs CN-DP recites, wherein the means for determining the plurality of regions of the digital image includes means for grouping areas of the filtered digital image so that individual ones of the plurality of regions of the digital image have respective sizes above a selected size threshold.

DR: A system or device as any of paragraphs CN-DQ recites, further comprising: means for determining a plurality of color-difference thresholds based at least in part the respective color values of a plurality of the regions; means for selecting one or more groups of neighboring ones of the regions having respective color values separated by less than corresponding ones of the color-difference thresholds; and means for determining, for individual ones of the selected groups, respective ones of the proximity relationships corresponding to differences between respective albedo values of the ones of the regions in that group.

DS: A system or device as any of paragraphs CN-DR recites, further comprising: means for determining respective texture values of one or more of the regions; means for selecting one or more groups of ones of the regions having respective texture values separated by less than one or more selected texture-difference thresholds; and means for determining, for individual ones of the selected groups, respective ones of the proximity relationships corresponding to differences between respective albedo values of the ones of the regions in that group.

DT: A system or device as any of paragraphs CN-DS recites, further comprising: means for selecting one or more groups of ones of the regions having respective geometry values separated by less than one or more geometry-difference thresholds; and means for determining, for individual ones of the selected groups, respective ones of the proximity relationships corresponding to differences between respective shading values of the ones of the regions in that group.

DU: A system or device as any of paragraphs CN-DT recites, further comprising: a first memory for storing the digital image, the digital image having data of a plurality of pixels, the data of individual ones of the pixels including respective values for individual ones of a plurality of color channels; and a second memory for storing the region map.

DV: A system or device as any of paragraphs CN-DU recites, further comprising means for providing at least some of the proximity relationships based at least in part on respective color values of one or more ungrouped pixels of the digital image.

CONCLUSION

Image decomposition techniques described herein can provide albedo and shading information using reduced processing time and memory consumption compared to prior schemes. This can provide the ability to use albedo and shading images in a wider variety of contexts, such as the processing of each frame of a video of an object. Various aspects effectively detect and remove lighting from chromatic light sources to permit determining the albedo of an object lit by such sources.

Although the techniques have been described in language particular to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing devices 102 or 200 or with one or more image sources 104, such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable medium or media, e.g., a computer-readable storage medium or computer-readable storage media, or other computer storage device. Some or all of the methods can be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

The disclosure includes combinations of the examples described herein. References to a particular "example" (or "aspect," "version," "implementation," or "embodiment") and the like refer to features that are present in at least one example or configuration of what is within the scope of the disclosed subject matter. Separate references to "an example" or "particular examples" or the like do not necessarily refer to the same example or examples; however, such examples are not mutually exclusive, unless specifically indicated. The use of singular or plural in referring to "example," "examples," "method," "methods" and the like is not limiting.

Any routine descriptions, elements or blocks in the flow diagrams described herein and/or depicted in the attached figures should be understood as potentially representing modules, segments, or portions of code that include one or more executable instructions for implementing particular logical functions or elements in the routine. Alternative implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

The invention claimed is:

1. A system, comprising:
   at least one processor; and
   a memory coupled to the at least one processor and storing instructions that, when executed by the at least one processor, perform operations, comprising:
   generating an albedo map and a shading map based, at least in part, on a digital image and a color-difference threshold between a first region of the digital image and a second region of the digital image; and
   determining a color shading map based, at least in part, on the albedo map and the digital image;
   determining a lighting coefficient associated with the digital image based, at least in part, on the color shading map; and
   generating a revised digital image by adjusting the digital image based, at least in part, on the lighting coefficient.

2. The system of claim 1, further comprising instructions for determining, based at least in part, on color values of pixels of the digital image, a region map that identifies the first region of the digital image and the second region of the digital image.

3. The system of claim 1, further comprising instructions for filtering the digital image to reduce a number of unique colors within the digital image.

4. The system of claim 1, further comprising instructions for
   determining a proximity relationship between the first region of the digital image and the second region of the digital image.

5. The system of claim 4, further comprising instructions for selecting a group of regions including the first region of the digital image and a neighboring region of the first region when the first region and the neighboring region have respective color values separated by less than the color-difference threshold.

6. The system of claim 1, further comprising instructions for
   selecting a group of regions including the first region associated with the digital image and the second region associated with the digital image when the first region associated with the digital image and the second region associated with the digital image have respective supplemental values separated by less than a supplemental-value-difference threshold.

7. The system of claim 1, further comprising instructions for selecting a group of regions including the first region associated with the digital image and a neighboring region based, at least in part, on a difference between respective shading values of the first region and the neighboring region.

8. The system of claim 1, further comprising instructions for generating a revised albedo map and a revised shading map based at least in part on the revised digital image by:
   determining, for the first region and the second region, a shading contribution corresponding to the lighting coefficient; and
   determining a proximity relationship corresponding to a difference between the shading contribution of the first region and the shading contribution of the second region.

9. The system of claim 1, further comprising instructions for determining a reduced-color albedo map based, at least in part, on the albedo map by clustering values of the albedo map in a selected color space.

10. A device, comprising:
    at least one processor; and
    a memory coupled to the at least one processor and storing instructions that, when executed by the at least one processor, perform operations, comprising:
    generating respective albedo maps and respective shading maps for individual color channels of a digital image based, at least in part, on two or more regions of the digital image and on a color-difference threshold associated with the two or more regions;
    generating a color shading map based, at least in part, on the respective shading maps;
    determining a lighting coefficient based, at least in part, on the color shading map; and
    generating a revised digital image by adjusting the digital image based, at least in part, on the lighting coefficient.

11. The device of claim 10, further comprising instructions for
    determining, based at least in part, on color values of pixels of the digital image, a region map that includes the two or more regions.

12. The device of claim 10, further comprising instructions for
    producing a plurality of revised albedo maps and a plurality of revised shading maps based at least in part on the revised digital image.

13. A method, comprising:
    generating an albedo map and a shading map for a digital image based, at least in part, on a determined color-difference threshold between a first region of a plurality of regions of the digital image and a second region of the plurality of regions of the digital image;
    determining a color shading map, based at least in part, on the albedo map and the digital image;
    determining a lighting coefficient associated with the digital image; and
    generating a revised digital image by adjusting the digital image based, at least in part, on the lighting coefficient.

14. The method of claim 13, wherein the lighting coefficient is based, at least in part, on the albedo map or the color shading map.

15. The method of claim 13, further comprising determining respective color values of the first region of the plurality of regions of the digital image and the second region of the plurality of regions of the digital image.

16. The system of claim 1, further comprising instructions for determining a color value for the first region associated with the digital image and determining a color value for the second region associated with the digital image.

17. The system of claim 3, further comprising instructions for grouping areas of the digital image based, at least in part, on a color-difference grouping threshold.

18. The system of claim 4, wherein the generation of the albedo map and the shading map is based, at least in part, on the proximity relationship.

19. The system of claim 9, further comprising instructions for determining the color shading map based, at least in part, on content of the digital image not included in the reduced-color albedo map.

20. The device of claim 11, further comprising instructions for identifying regions of the region map using color values.

* * * * *